United States Patent
Sugaya et al.

(10) Patent No.: US 6,487,163 B1
(45) Date of Patent: Nov. 26, 2002

(54) OPTICAL DISK AND OPTICAL DISK APPARATUS

(75) Inventors: Toshihiro Sugaya, Ibaraki-ken; Yoshinori Honguh, Yokohama, both of (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/353,372

(22) Filed: Jul. 14, 1999

Related U.S. Application Data

(63) Continuation-in-part of application No. 09/096,744, filed on Jun. 12, 1998, now Pat. No. 5,959,963, which is a continuation of application No. 08/778,313, filed on Jan. 2, 1997, now Pat. No. 5,777,981, which is a continuation of application No. 08/541,598, filed on Oct. 10, 1995, now Pat. No. 5,602,825, which is a continuation-in-part of application No. 08/475,494, filed on Jun. 7, 1995, now Pat. No. 5,592,464, which is a continuation of application No. 08/304,849, filed on Sep. 13, 1994, now Pat. No. 5,459,712.

(30) Foreign Application Priority Data

Mar. 29, 1994 (JP) .............................. 6-004230

(51) Int. Cl.[7] ................................. G11B 7/24
(52) U.S. Cl. ................... 369/275.4; 369/275.3
(58) Field of Search ................. 369/275.4, 275.3, 369/275.2, 275.1, 275.5, 13, 59, 109–112, 283–284, 286, 288, 100, 124, 44.26

(56) References Cited

U.S. PATENT DOCUMENTS

| | | | |
|---|---|---|---|
| 4,587,648 A | * | 5/1986 | Ando |
| 4,734,904 A | * | 3/1988 | Imanaka |
| 5,060,223 A | * | 10/1991 | Segawa |
| 5,107,486 A | * | 4/1992 | Inui |
| 5,216,655 A | * | 6/1993 | Imataki |
| 5,274,623 A | * | 12/1993 | Usami |
| 5,459,712 A | * | 10/1995 | Sugaya |
| 5,592,464 A | * | 1/1997 | Sugaya |
| 5,602,825 A | * | 2/1997 | Sugaya |
| 5,708,651 A | * | 1/1998 | Sugaya et al. |
| 5,777,981 A | * | 7/1998 | Sugaya et al. ........... 369/275.4 |
| 5,959,963 A | * | 9/1999 | Sugaya et al. ........... 369/275.4 |

FOREIGN PATENT DOCUMENTS

| | | | |
|---|---|---|---|
| EP | 0 132 137 A2 | * | 1/1985 |
| EP | 0 132 137 B1 | * | 12/1990 |
| EP | 0 553 541 A1 | * | 8/1993 |
| EP | 0 553 573 A1 | * | 8/1993 |

OTHER PUBLICATIONS

Jozef Braat, Principles of OPtical Disc Systems, ch. 2, "Read–out of Optical Discs", Sec. 2.2.3, pp. 17–19 (1985).*

Teraeo et al., Fundamentals of Optical Memory, "Recordable and Erasable Optical Memory Medium", pp. 60–61 (1990).*

K. Yamada et al., "Tracking Method for Optical Disk Systems with Composite Detection". Abstracts of Lectures given at the 54th Meeting of the Japanese Society of Applied Physics Sep. 27, 1993, 28a–SF–16, p. 1009.*

Sugaya et al., Performance of a 600 Mbyte 90mm Phase–Change OPtical Disk Against Disk Tilt, JPN.J.Appl.Phys vol. 32.5402–5405 ( 1993 ).*

* cited by examiner

*Primary Examiner*—Ali Neyzari
(74) *Attorney, Agent, or Firm*—Pillsbury Winthrop LLP

(57) ABSTRACT

An optical disk comprising a substrate in which information to be picked up by a light beam radiated thereto through an objective lens are recorded as pit arrays formed at a predetermined track pitch, and a reflective layer formed on the substrate, the track pitch is set within a range of (0.72 to 0.8)α×(λ/NA)/1.14 μm, when a wavelength of the light beam is λnm and the objective lens has a numerical aperture of NA, the α is represented by:

α=3.617×10$^{-14}$×(θA $ds$/λ)$^3$+1.248×10$^{-9}$×(θA $ds$/λ)$^2$+0.865 when a thickness of the optical disk is ds μm, and an allowable tilt angle of θA, and the allowable tilt angle θA is not more than 7 mrad.

16 Claims, 20 Drawing Sheets

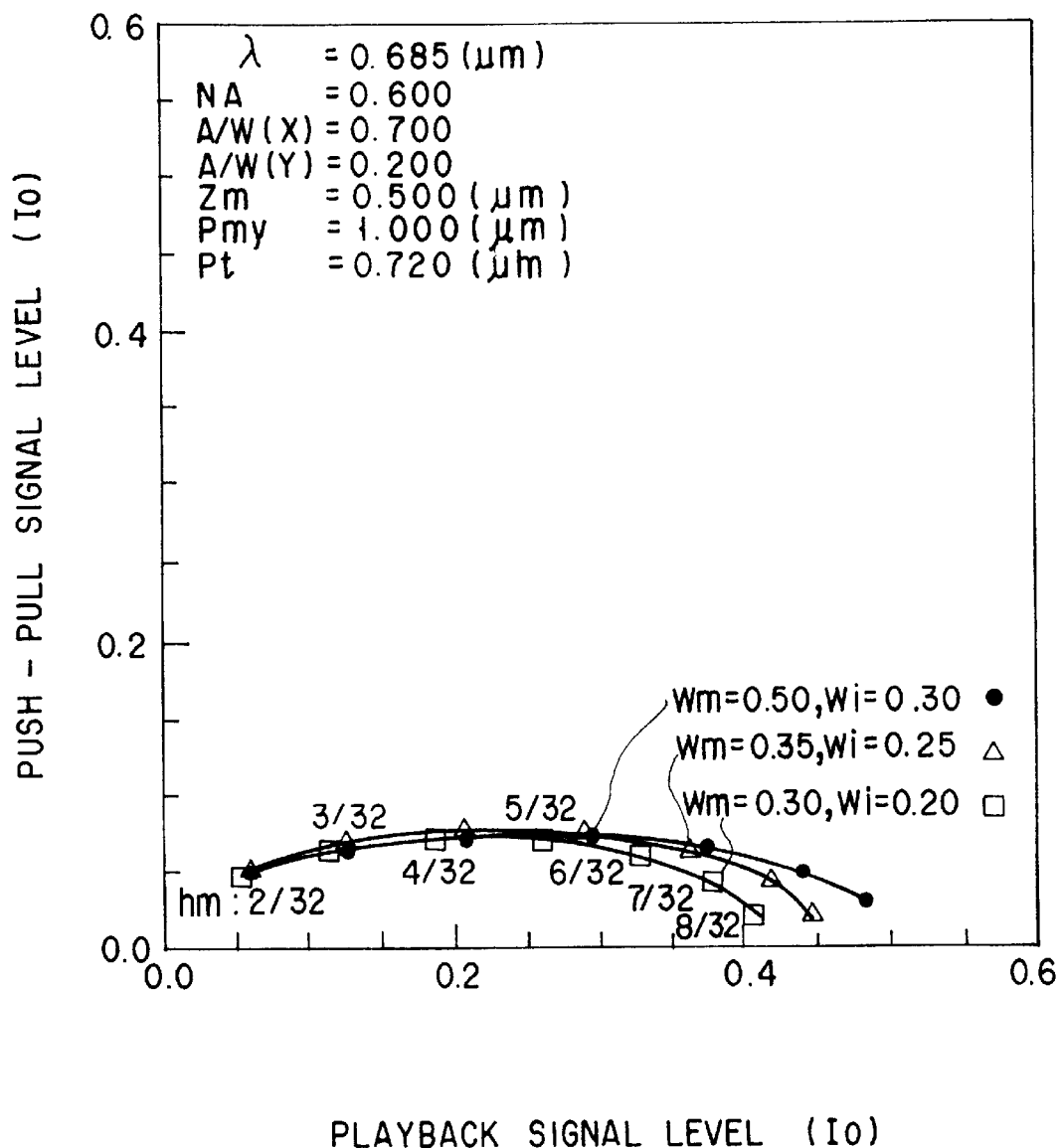
F I G. 4

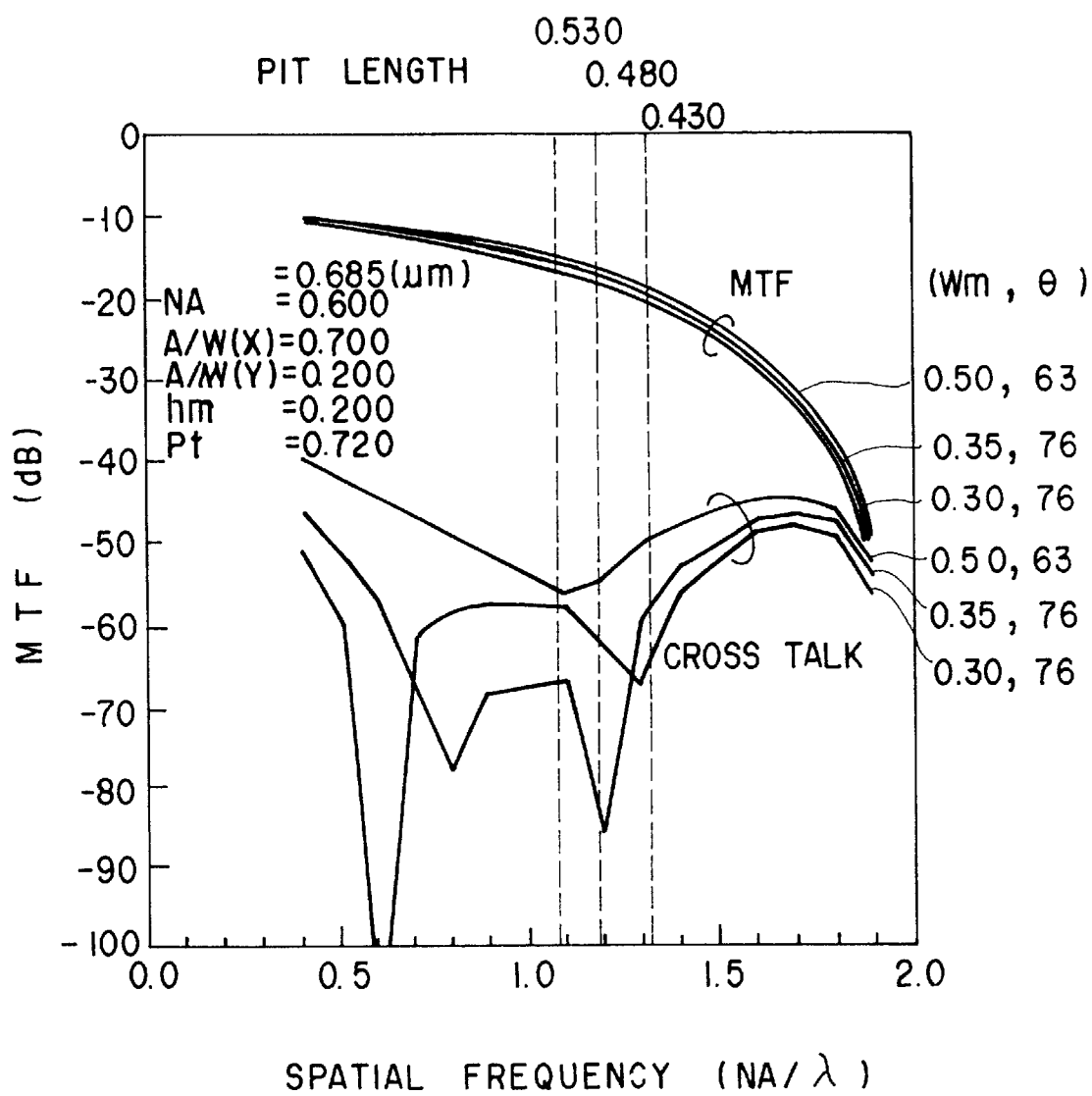
F I G. 8

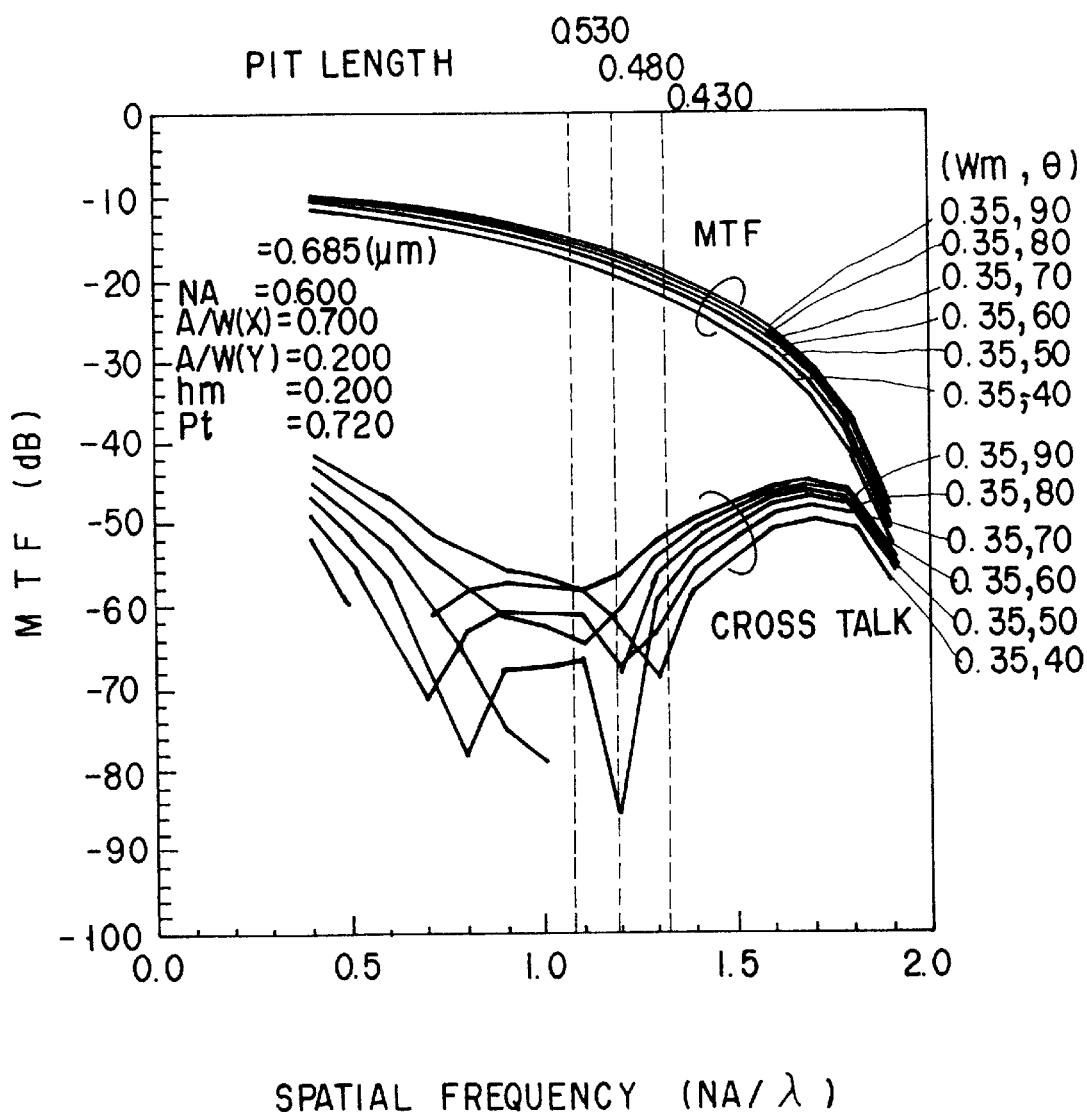
F I G. 9

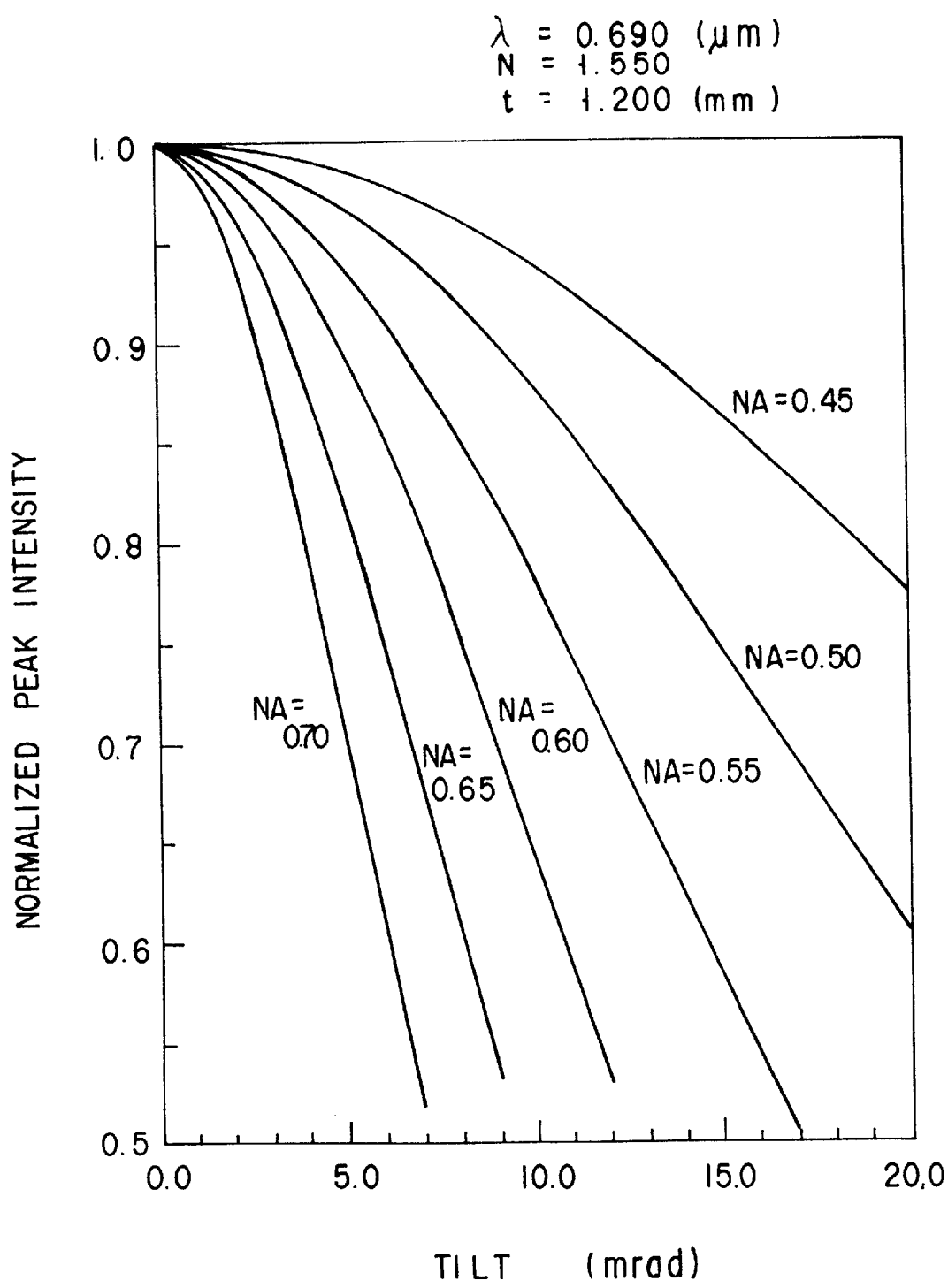
F I G. 11

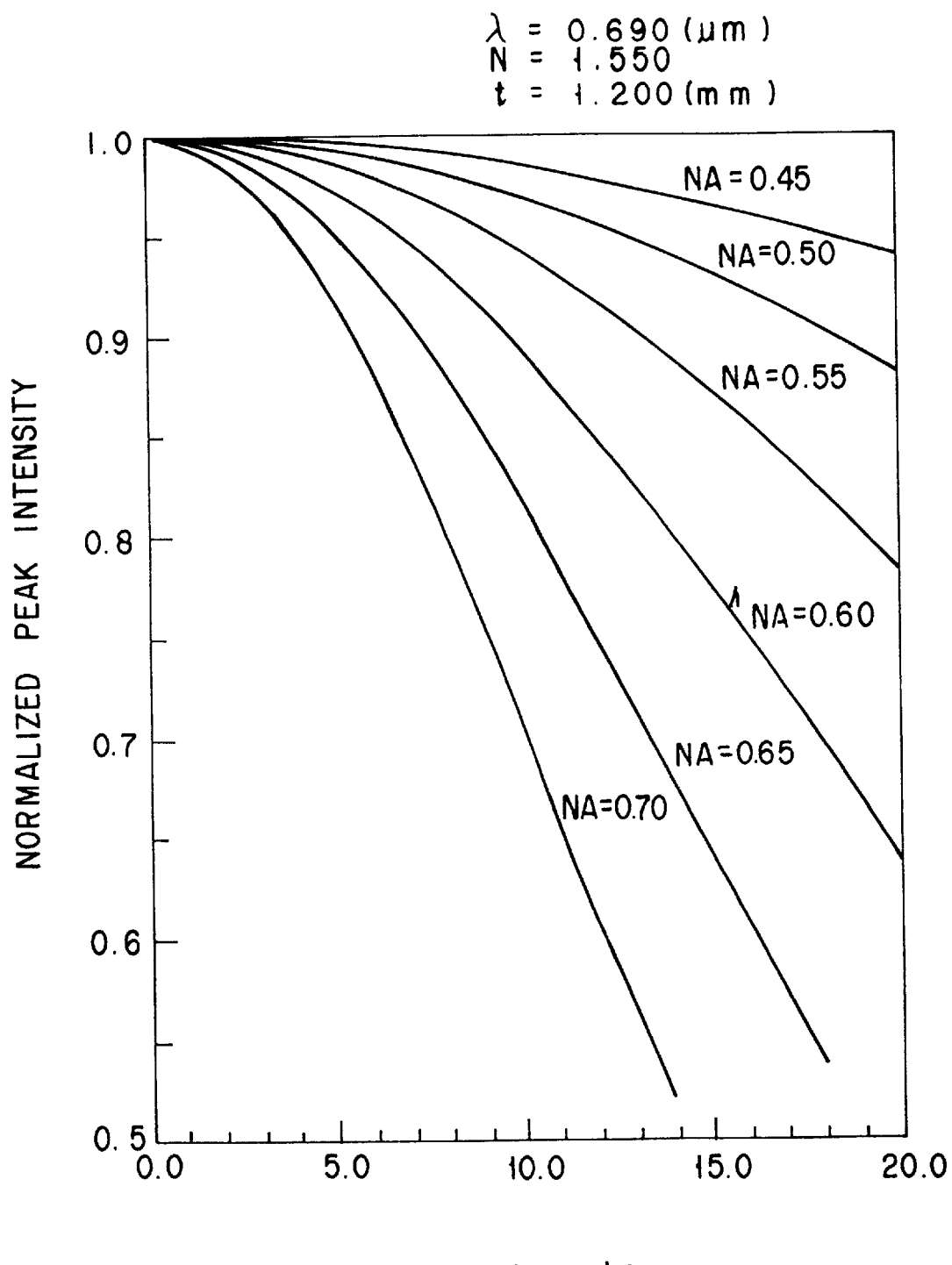
F I G. 12

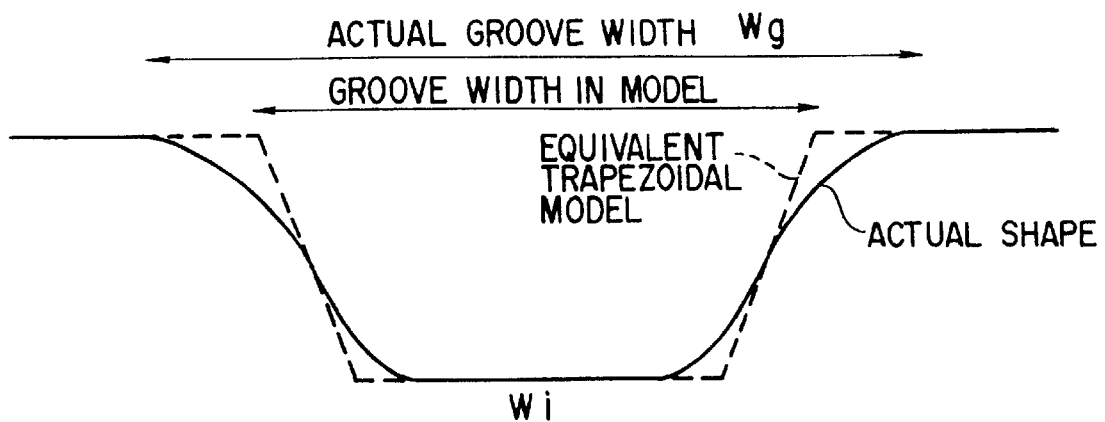
F I G. 13
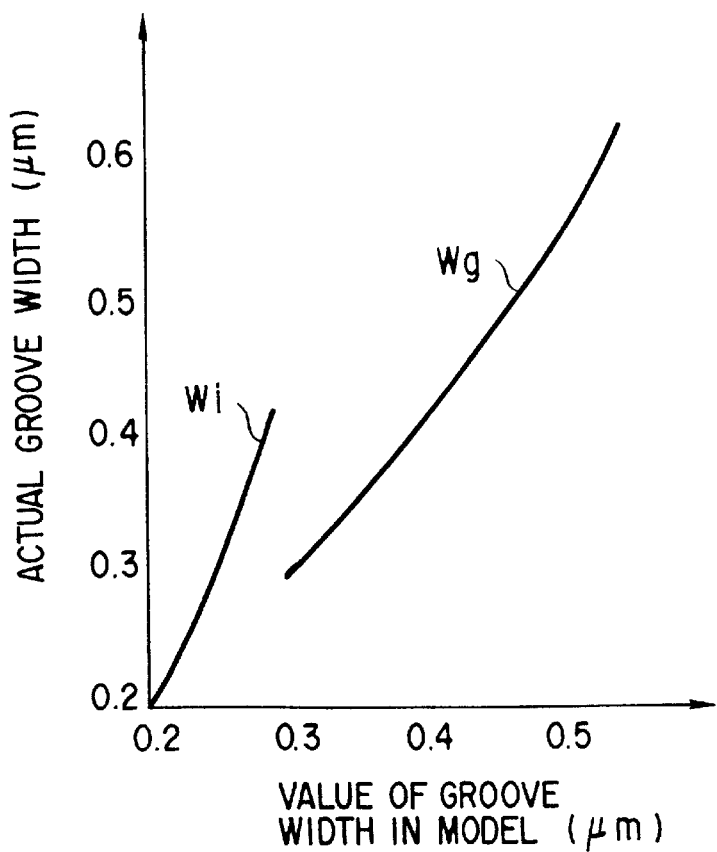
F I G. 14

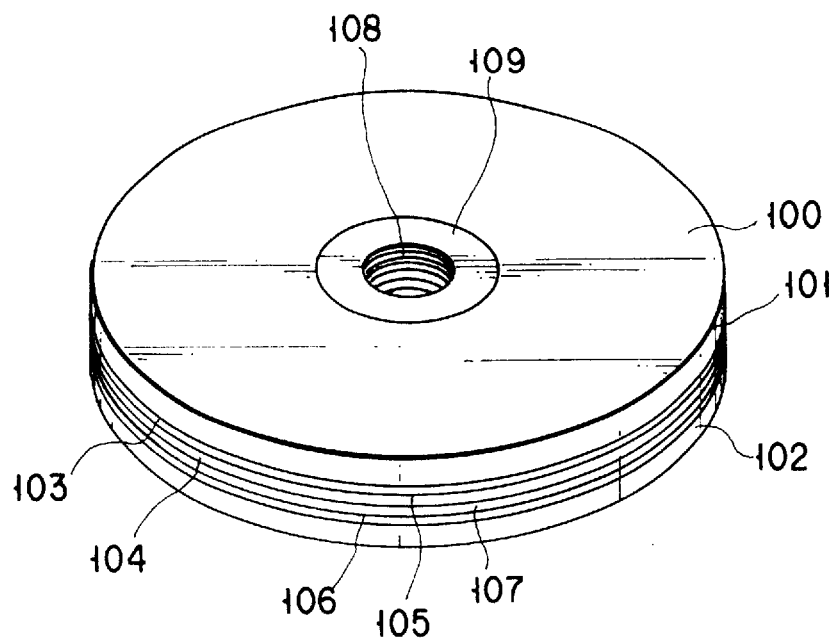
F I G. 16A
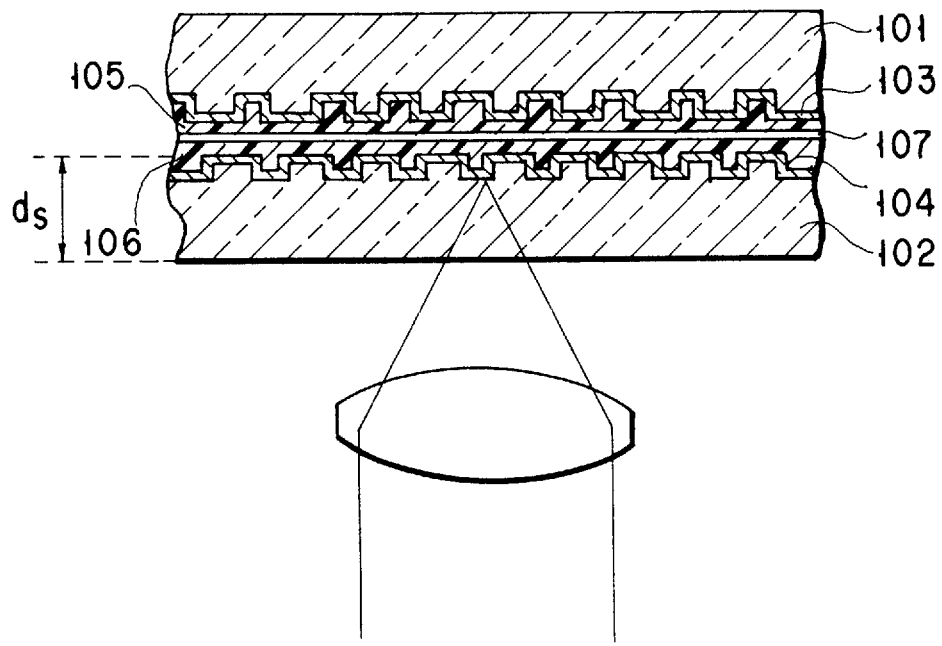
F I G. 16B $\theta A(ds=600 \; \lambda=0.65)$

RADIAL DIRECTION OF OPTICAL DISK

→ TANGENTIAL DIRECTION OF OPTICAL DISK

OPTICAL DISK AND OPTICAL DISK APPARATUS

CROSS-REFERENCE TO RELATED APPLICATION

This is a continuation-in-part of prior application No. 09/096,744, filed Jun. 12, 1998, now U.S. Pat. No. 5,959,963 which is a continuation of U.S. patent application Ser. No. 08/778,313, filed Jan. 2, 1997 now U.S. Pat. No. 5,777,981, which is a continuation application of U.S. patent application Ser. No. 08/541,598, filed Oct. 10, 1995 now U.S. Pat. No. 5,602,825, which is a continuation-in-part of U.S. patent application Ser. No. 08/475,494, filed Jun. 7, 1995 now U.S. Pat. No. 5,592,464, which is a continuation of U.S. patent application Ser. No. 08/304,849, filed Sep. 13, 1994 now U.S. Pat. No. 5,459,712.

BACKGROUND OF THE INVENTION

This invention relates to an optical disk on which information is recorded in pits with high density and an optical disk apparatus containing the optical disk and a reproduction optical system.

With the recent advances in image digital signal processing techniques and moving-picture compression techniques, the latter of which have been developed by such a standardizing organization as the MPEG (Moving Picture Image Coding Experts Group), there is a growing expectation of the advent of an optical disk capable of reproducing moving-picture information such as a movie for two hours and being the same size as a CD (compact disk) in place of a VTR or laser disk. The recording capacity required to record two hours of moving-picture information in the form of analog video signals by a standard TV system such as NTSC as on the laser disk, amounts to 80 Gbyte including sound. Use of moving-picture compression techniques prescribed by a standardized method called MPEG-2, for example, requires as small a capacity as nearly 4 Gbyte even for a picture quality as good as a high picture-quality VTR such as S-VHS. The 4-Gbyte disk has been put into practical use in the form of a 300-mm diameter write-once read-many optical disk. As more and more optical disks will be used in homes in the future, it is needed to achieve an easy-to-use 120-mm diameter disk which has the same size and almost the same capacity as the CD.

The capacity of the CD format presently available as the music CD or the CD-ROM is 790 Mbyte at the maximum (when the linear velocity is 1.2 m/s). The capacity of this order can store only 24 minutes of compressed moving-picture information by MPEG-2. Thus, to store two hours of compressed moving-picture information by MPEG-2 with the CD size, the recording density must be made five times as high as that of the CD. In the current CD format, the substrate thickness is 1.2 mm, the track pitch is 1.6 $\mu$m, the pit pitch is 1.66 $\mu$m when the linear velocity (relative velocity between light beam and disk=disk's circumferential velocity) is 1.2 m/s, the bit length is 0.59 $\mu$m, and the modulation method is EFM (eight to fourteen modulation). In the reproduction optical system, the reproduction semiconductor laser, or the laser diode (LD) has a wavelength of 780 nm, the object lens has an NA (numerical aperture) of 0.45, and the beam spot has a diameter of 1.4 $\mu$m. The beam spot diameter is selected mainly from the standpoint of avoiding the effect of cross talk between adjacent tracks.

To increase the recording density of the optical disk requires techniques for forming small pits in the disk and those for making the beam spot size small on the optical disk in the reproduction optical system. Concerning techniques for forming pits, for example, an optical disk matrix recording technique using Kr ion laser light (ultraviolet rays) with a wavelength of 351 nm has been proposed (The 1993 Autumn National Convention of the Applied Physics Society, 28-SF-2). This technique makes it possible to form smaller pits than a conventional Ar ion laser. In the reproduction optical system, by making the wavelength of the reproduction laser beam shorter and increasing the NA, the beam spot diameter can be made smaller. Actually, however, with conventional techniques used in CD players, even if a short wavelength light source such as a red laser diode were used, the capacity would be increased by 1.5 times at most. With such an increase in the capacity, it cannot be expected to increase the capacity by five times that of an ordinary CD, which is what is required to record two hours of compressed moving-picture information.

As described above, with the conventional optical disk techniques, to avoid the problem of cross talk between adjacent tracks, the track pitch and pit pitch are set larger than the beam spot diameter of the reproduction light beam. As a result, only by making the wavelength of reproduction light beam shorter and increasing the NA of the object lens, the recording density cannot be raised to the extent that the capacity required to store two hours of compressed moving-picture information by MPEG-2 with the CD size, for example.

BRIEF SUMMARY OF THE INVENTION

It is an object of the present invention to provide an optical disk and an optical disk apparatus which can lessen cross talk between adjacent tracks to the extent that there is no problem in practical use, even if the track pitch and pit pitch are smaller than the beam spot diameter of the reproduction light beam, and which achieves a higher density and a greater capacity than in the prior art.

It is another object of the present invention to provide a optical disk and an optical disk apparatus which enable a high density recording in a tilt angle of the optical disk which is less than 10 mrad.

According to the present invention, there is provided an optical disk comprising: a substrate in which information to be picked up by a light beam radiated thereto through an objective lens are recorded as pit arrays formed at a predetermined track pitch; and a reflective layer formed on the substrate, the track pitch being set within a range of (0.72 to 0.8)$\alpha \times (\lambda /NA)/1.14$ $\mu$m, when the light beam has a wavelength of $\lambda$ nm and the objective lens has a numerical aperture of NA, the $\alpha$ being represented by:

$\alpha = 3.617 \times 10^{-14} \times (\theta A \ ds/\lambda)^3 + 1.248 \times 10^{-9} \times (\theta A \ ds/\lambda)^2 + 0.865$ when the optical disk has a thickness of ds $\mu$m, and an allowable tilt angle of $\theta A$, and the allowable tilt angle $\theta A$ being not more than 7 mrad.

According to the present invention, there is provided an optical disk apparatus comprising: an optical disk including a substrate in which information are recorded as pit arrays formed at a predetermined track pitch, and a reflective layer formed on the substrate; an objective lens arranged to face the optical disk; a light beam generator which radiates a light beam onto the optical disk through the objective lens; and a reproduction unit which detects a reflected beam of the light beam radiated onto the optical disk by the light beam generator so as to reproduce the information recorded in the optical disk, the track pitch being set within a range of (0.72 to 0.8)α×(λ/NA)/1.14 μm, when the light beam has a wavelength of λ nm and the objective lens has a numerical aperture of NA, the α being represented by:

$$\alpha = 3.617 \times 10^{-14} \times (\theta A \ ds/\lambda)^3 + 1.248 \times 10^{-9} \times (\theta A \ ds/\lambda)^2 + 0.865$$

when the optical disk has a thickness of ds μm, and an allowable tilt angle of θA, and the allowable tilt angle θA being not more than 7 mrad.

According to the present invention, there is provided an optical disk comprising: a pair of transparent substrates which face each other and in which information to be reproduced in response to a light beam radiated thereto through an objective lens are recorded as pit arrays formed at a predetermined track pitch; and a pair of reflective layers formed on those sides of the transparent substrates which face each other, the track pitch being set within a range of (0.72 to 0.8)α×(λ/NA)/1.14 μm, when the light beam has a wavelength of λ nm and the objective lens has a numerical aperture of NA, the α being represented by:

$$\alpha = 3.617 \times 10^{-14} \times (\theta A \ ds/\lambda)^3 + 1.248 \times 10^{-9} \times (\theta A \ ds/\lambda)^2 + 0.865$$

when the optical disk has a thickness of ds μm, and an allowable tilt angle of θA, and the allowable tilt angle θA being not more than 7 mrad.

According to the present invention, there is provided an optical disk comprising: a substrate in which information to be reproduced in response to a light beam radiated thereto through an objective lens are recorded as pit arrays formed at a predetermined track pitch; and a reflective layer formed on the substrate, the track pitch being set within a range of (0.72 to 0.8)α×(λ/NA)/1.14 μm, when the light beam has a wavelength of λ nm and the objective lens has a numerical aperture of NA, each of pits of the pit arrays being a trapezoidal-section pit which has an upper-region width within a range of (0.3 to 0.50)α×(λ/NA)/1.14 μm and a lower-region width within a range of (0.2 to 0.32)α×(λ/NA)/1.14 μm, and the α being represented by:

$$\alpha = 3.617 \times 10^{-14} \times (\theta A \ ds/\lambda)^3 + 1.248 \times 10^{-9} \times (\theta A \ ds/\lambda)^2 + 0.865$$

when the optical disk has a thickness of ds μm, and an allowable tilt angle of θA.

According to the present invention, there is provided an optical disk apparatus comprising: an optical disk including a substrate in which information are recorded as pit arrays formed at a predetermined track pitch, and a reflective layer formed on the substrate; an objective lens arranged to face the optical disk; means for radiating a light beam onto the optical disk through the objective lens; and means for detecting a reflected beam of the light beam radiated onto the optical disk by the radiating means so as to reproduce the information recorded in the optical disk, the track pitch being set within a range of (0.72 to 0.8)α×(λ/NA)/1.14 μm, when the light beam has a wavelength of λ nm and the objective lens has a numerical aperture of NA, each of pits of the pit arrays being a trapezoidal-section pit which has an upper-region width within a range of (0.3 to 0.50)α×(λ/NA)/1.14 μm and a lower-region width within a range of (0.2 to 0.32)α×(λ/NA)/1.14 μm, and the α being a multiplication ratio that ensures an allowable disk tilt angle when the wavelength is 0.65 μm, and being represented by:

$$\alpha = 3.617 \times 10^{-14} \times (\theta A \ ds/\lambda)^3 + 1.248 \times 10^{-9} \times (\theta A \ ds/\lambda)^2 + 0.865.$$

According to the present invention, there is provided an optical disk comprising: a substrate in which information to be reproduced in response to a light beam radiated thereto through an objective lens are recorded as pit arrays formed at a predetermined track pitch; and a reflective layer formed on the substrate, the track pitch being set within a range of (0.72 to 0.8)α×(λ/NA)/1.14 μm, when the light beam has a wavelength of λ nm and the objective lens has a numerical aperture of NA, each of pits of the pit arrays being a trapezoidal-section pit which has an upper-region width within a range of (0.3 to 0.50)×(λ/NA)/1.14 μm and a lower-region width within a range of (0.2 to 0.32)×(λ/NA)/1.14 μm, and the α being a multiplication ratio that ensures an allowable disk tilt angle when the wavelength is 0.65 μm, and being represented by:

$$\alpha = 3.617 \times 10^{-14} \times (\theta A \ ds/\lambda)^3 + 1.248 \times 10^{-9} \times (\theta A \ ds/\lambda)^2 + 0.865.$$

According to the present invention, there is provided an optical disk apparatus comprising: an optical disk including a substrate in which information are recorded as pit arrays formed at a predetermined track pitch, and a reflective layer formed on the substrate; an objective lens arranged to face the optical disk; a light beam generator which radiates a light beam onto the optical disk through the objective lens; and a reproduction head which detects a reflected beam of the light beam radiated onto the optical disk by the light beam generator so as to reproduce the information recorded in the optical disk, the track pitch being set within a range of (0.72 to 0.8)α×(λ/NA)/1.14 μm, when the light beam has a wavelength of λ nm and the objective lens has a numerical aperture of NA, each of pits of the pit arrays being a trapezoidal-section pit which has an upper-region width within a range of (0.3 to 0.50)×(λ/NA)/1.14 μm and a lower-region width within a range of (0.2 to 0.32)×(λ/NA)/1.14 μm, and the α being a multiplication ratio that ensures an allowable disk tilt angle when the wavelength is 0.65 μm, and being represented by:

$$\alpha = 3.617 \times 10^{-14} \times (\theta A \ ds/\lambda)^3 + 1.248 \times 10^{-9} \times (\theta A \ ds/\lambda)^2 + 0.865.$$

By setting various parameters of the pit shape at the above-described values, the amount of cross talk between adjacent tracks is suppressed to less than −20 dB, which must be met to restore the original information from the reproduced signal, and the reproduced signal level and the level of the push-pull signal for tracking are maintained sufficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows the relationship between the reproduced signal level and the push-pull signal level obtained from calculations using the pit size in the track width direction and the pit depth as parameters;

FIG. 8 shows the dependence of the reproduction optical system's MTF and the characteristics of crosswalk between adjacent tracks on the pit shape when the upper width Wm and the angle $\theta$ of the pit's inner wall are changed variously;

FIG. 9 shows the dependence of the reproduction optical system's MTF and the characteristics of cross talk between adjacent tracks on the pit shape when the conditions are the same as in FIG. 8 except that the upper width Wm of pit is fixed at 0.35 $\mu$m;

FIG. 11 shows the dependence of the NA of the object lens on the tilt when an optical disk whose substrate thickness is 1.2 mm is used;

FIG. 12 shows the dependence of the NA of the object lens on the tilt when an optical disk whose substrate thickness is 0.6 mm is used;

FIG. 13 shows a cross sectional outline of an actual pit;

FIG. 14 shows a relationship between the groove width of an actual pit and the groove width of a model pit;

FIGS. 16A and 16B are a perspective view and a sectional view of an optical disk according to an embodiment of the present invention.

DETAILED DESCRIPTION OF THE INVENTION

Figure 1:
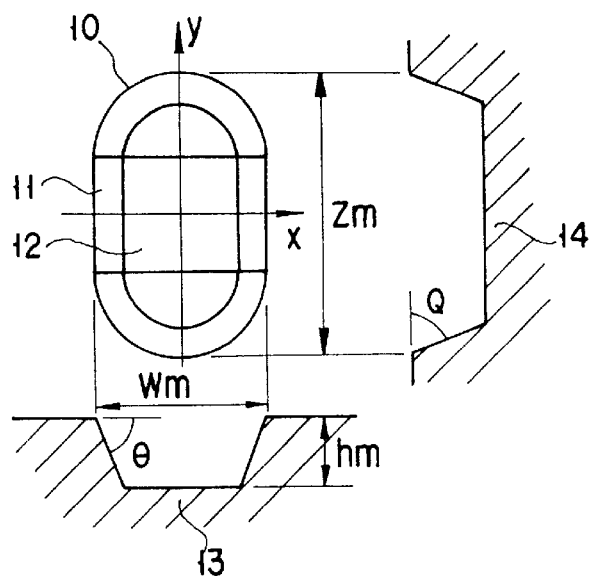
FIG. 1 is a diagrammatic view to help explain the shape of a pit in an optical disk according to an embodiment of the present invention.

Before explanation of an embodiment, the basic concept of the present invention will be described.

To make the density of the optical disk higher, a spot diameter of the reproduction light beam must be made smaller. To do this, it is essential to make the wavelength of the reproduction laser diode shorter and increase the NA of the objective lens. Laser diodes (self-pulsation-type laser diodes) of a low-noise type whose wavelength is 0.685 $\mu$m and whose output is several milliwatts have already been put into practical use. Laser diodes whose wavelength is 0.650 $\mu$m are getting close to practical use.

The NA of the objective lens is limited by ease of making a lens and the tilt angle between the lens and the disk. The smaller the lens load (the thinner the optical disk substrate, the smaller the lens load) and the smaller the NA, the easier it is to make the objective lens. For an objective lens whose NA is nearly 0.6, it is possible to make the beam spot diameter smaller even with a single nonspherical lens. However, with an objective lens used in the reproduction optical system for the optical disk, coma aberration occurs due to the tilt between the optical disk and the reproduction light beam caused by the tilt of the optical disk or the tilt of the optical axis of the objective lens.

Specifically, an attempt to make the NA of the object lens larger in order to make the spot size of the reproduction light beam smaller permits the aberration of the objective lens to increase sharply due to the tilt between the optical disk and the reproduction light beam. As the aberration of the objective lens becomes larger, the amount of cross talk between adjacent tracks increases accordingly, and the reproduction resolving power decreases. The thinner the optical disk substrate, the smaller the effect of the tilt. In Japanese Journal of Applied Physics, Vol. 32 (1993), pp. 5402–5405, changes in the shape of the spot of the reproduction light beam corresponding to the tilt when the substrate thickness is 1.2 mm, the same as the CD, and 0.6 mm, with a wavelength of 0.690 $\mu$m and NA=0.6 are explained. According to this description, when the substrate thickness is 1.2 mm, a tilt of 5 mrad lowers the center strength of the beam spot as much as 10% and causes a rise in the side lobe and aberration, which contributes to cross talk. In contrast, when the substrate thickness is 0.6 mm, the substrate can withstand the tilts ranging up to 10 mrad.

FIGS. 11 and 12 show the results of calculating the tilt characteristics when the substrate thickness (t) is 1.2 mm and 0.6 mm using the NA as a parameter. The abscissa represents the angle of tilt and the ordinate indicates the normalized peak intensity of the reproduced signal. The wavelength ($\lambda$) of the reproduction light beam is assumed to be 0.690 $\mu$m. With the substrate thickness being 0.6 mm and the NA=0.6, the tilt is 9.5 mrad and the peak intensity of the reproduced signal decreases by 10%. When the substrate thickness is 1.2 mm, the NA=0.49. Specifically, by changing the substrate thickness from 1.2 mm (the conventional CD's thickness) to 0.6 mm, the NA can be increased from 0.49 to 0.6, and consequently the surface recording density can be increased by 1.5 times. Because the spot size is proportional to λ/NA and the surface recording density is inversely proportional to the square of the spot size, this gives $(0.6/0.49)^2$, which means that the area recording density is 1.5 times as high as that of the conventional CD.

However, just making the substrate thickness thinner can cause the substrate to warp substantially due to temperature or humidity. The warp of the substrate contributes mainly to the tilt. To avoid this, it is most effective to make the optical disk double-sided as the laser disk, or to give the optical disk a symmetrical structure with respect to the front and back. In that case, it is possible to record information on both sides. With a single-structure optical disk like the conventional CD, since an aluminum reflective film or protective film is formed on one side of the substrate, the substrate has an asymmetrical moisture absorption with respect to the front and back, and thus tends to warp easily. A double-sided optical disk cancels the distortion of the substrate due to moisture absorption, thereby preventing a large tilt from occurring.

The evaluation results described above show that if a combination of a laser diode with a wavelength of 0.685 μm, a 0.6 mm thick substrate, and an objective lens with an NA=0.6 are used, the wavelength will be shortened from 0.780 μm to 0.685 μm and the NA will grow larger from 0.45 to 0.6, so that the recording density can be made about 2.3 times as large as that of the conventional CD format even by conventional CD design techniques. Specifically, because the spot size is proportional to λ/NA and the surface recording density is proportional to the power of the spot size, this gives (0.780/0.45)/(0.685/0.6), meaning that the recording density is about 2.3 times as high as that of the conventional CD. However, to achieve the capacity required to record two hours of compressed moving-picture information by MPEG-2 with the CD size, it is necessary to make the recording density (capacity) about five times as large as that of the conventional CD format.

According to the present invention, there is provided an optical disk which enables the track pitch to be made much smaller in order to achieve a much higher density and greater capacity, while assuring the low cross talk characteristics and the sufficient signals levels of the reproduced signal and the push-pull signal by optimizing the pit shape of the same beam spot size as described above. Hereinafter, the pit shape in the present invention will be described in detail.

FIG. 1 is an explanatory diagram of the shape of a pit in an optical disk according to the present invention. As shown in the figure, the shape of a pit 10 is approximated by a shape with a trapezoidal cross section. The inner wall 11 of the pit 10 is inclined downward and its bottom portion 12 is almost flat. Numeral 13 indicates the cross section of the pit 10 along the radius of the optical disk (the track width direction); 14 the cross section along the circumference of the optical disk (the track direction); Wm the size of the top of pit 10 across the track width (hereinafter, the upper width); Wi the size of the bottom of the pit 10 across the track width (hereinafter, the lower width); hm the depth of the pit 10, Zm the length of the pit 10 along the track; and θ represents the angle of the inner wall of the pit 10 (the angle that the inner wall forms with respect to the surface of the optical disk).

Figure 2:
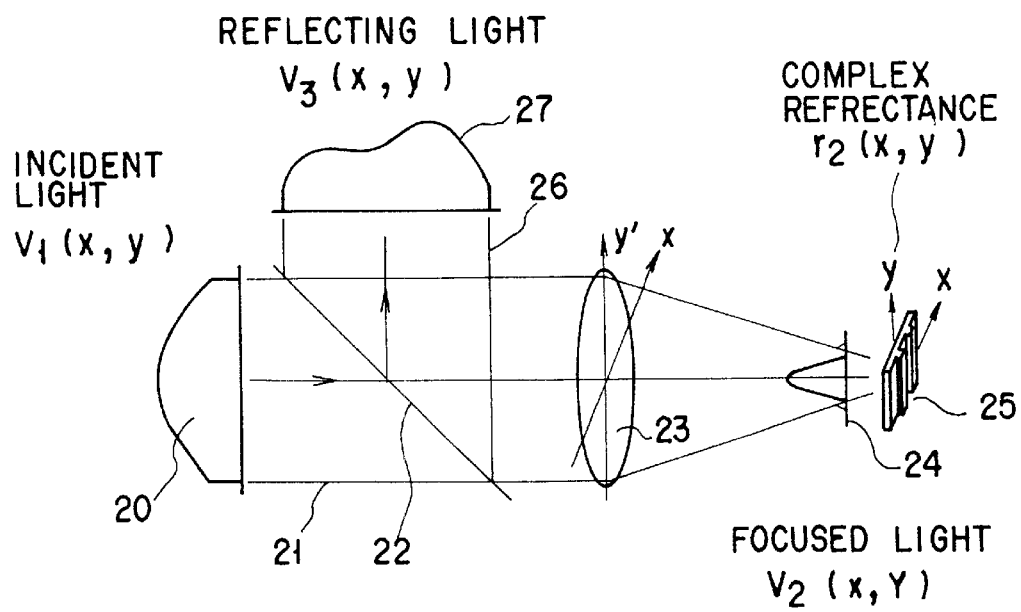
FIG. 2 is a schematic diagram of the reproduction optical system in an optical disk apparatus.

FIG. 2 shows a model of the reproduction optical system of the optical disk apparatus used in the analysis. The figure shows the incident light distribution 20 (V1(x,y)) of reproduction light beam, incident light 21, a polarization beam splitter (or half mirror) 22 for separating the incident light 21 from the reflected light 26, an objective lens 23 with a numerical aperture of NA, the distribution 24 (V2(x,y)) of focused light (beam spot) by the object lens on the recording surface (pit surface) of the optical disk, an optical disk 25 with a complex reflectivity of r2(x,y), the reflected light 26, and the distribution 27 (V3(x,y)) of the reflected light 26 on a photosensor.

Figure 3:
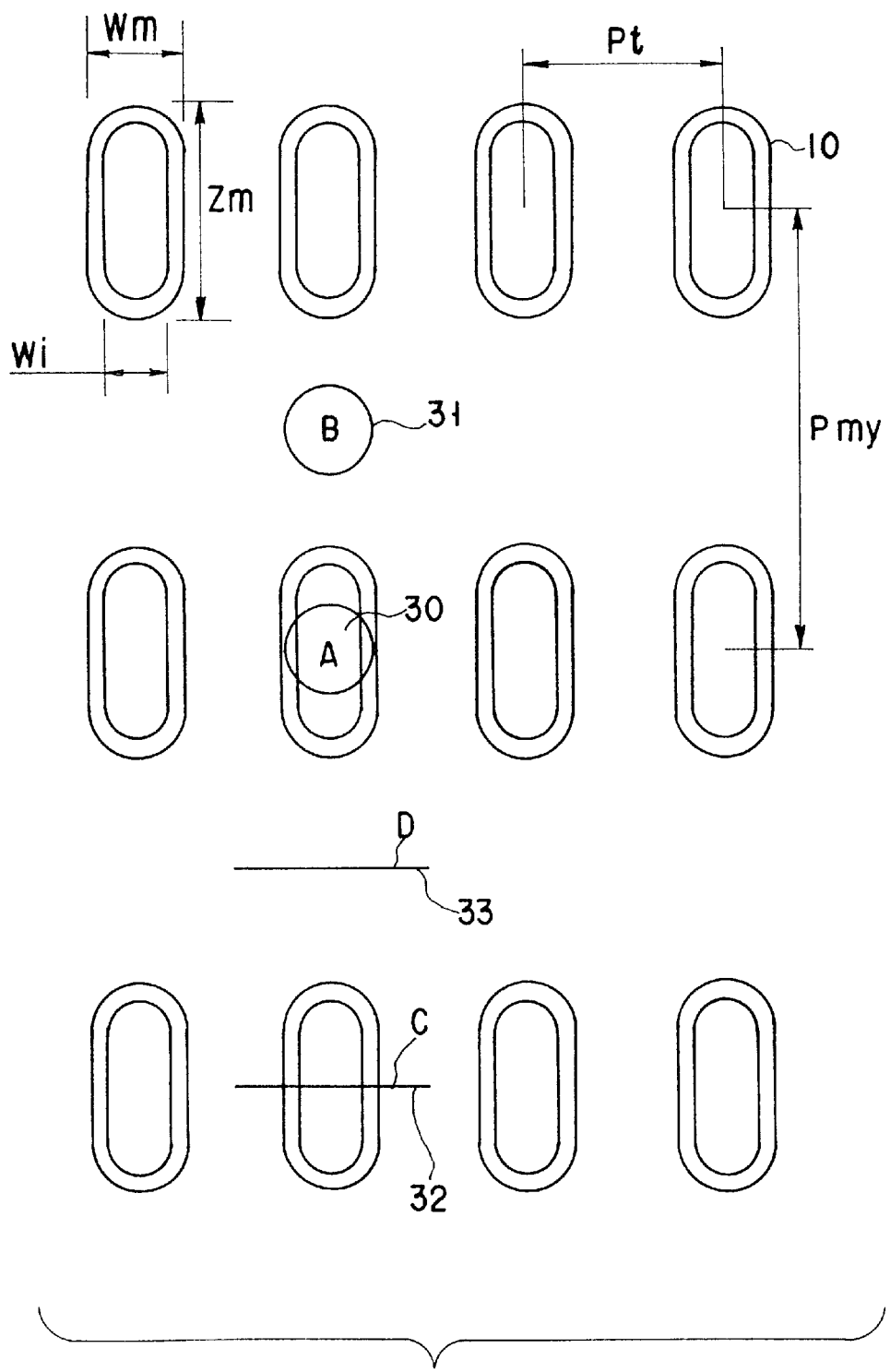
FIG. 3 is a diagrammatic view of the pit arrangement on the optical disk for calculating the levels of the reproduction and push-pull signals sensed from the optical disk.

FIG. 3 diagrammatically shows the pit arrangement on the optical disk used to calculate the levels of the reproduced signal and the push-pull signal, where the track pitch (the pitch of a pit across the track width) is Pt and the pit pitch (the pit pitch along the track) is Pmy. The beam spots 30 and 31 of the reproduction light beam represent spot A at the center of a pit and spot B between pits, respectively. The amplitude of the reproduced signal is represented as |S(A)−S(B)|, where S(A) and S(B) indicate the output signals of the photosensor when the beam spot is positioned at (A) and (B), respectively. Lines 32 and 33 show the positions in which the push-pull signal (the difference signal between the output signals of the split photosensors arranged along the track in at least two sensing areas) is obtained in an area (C) with pits and an area (D) without pits. Those push-pull signals each have the average p—p values in area C and area D.

FIG. 4 shows the results of calculating the levels of the reproduced signal and the push-pull signal using the size of a pit across the track width and the pit depth as parameters with a reproduction laser beam wavelength of 0.685 μm, NA=0.6, Zm=0.5 μm, Pmy=1 μm, and Pt=0.72 μm. The beam filling factors A/W(X) and A/W(Y) of the reproduction light beam across the track width (X) and along the track (Y) are shown in the figure. As seen from the figure, the levels of the reproduced signal and the push-pull signal do not depend largely on the shape of a pit except the case where Wm=0.3 and Wi=0.2. There is no such pit depth as brings the levels of the reproduced signal and the push-pull signal to the maximum level simultaneously. To minimize a decrease in the push-pull signal level and obtain the maximum reproduced signal level, it is desirable from FIG. 4 that the pit depth should be approximately λ/5, preferably in the range of λ/4.2 to λ/5.2. More specifically, the pit has a depth in a range of 1/4.2×λ/n to 1/5.2×λ/n, where n is a refractive index of the substrate.

Figure 5:
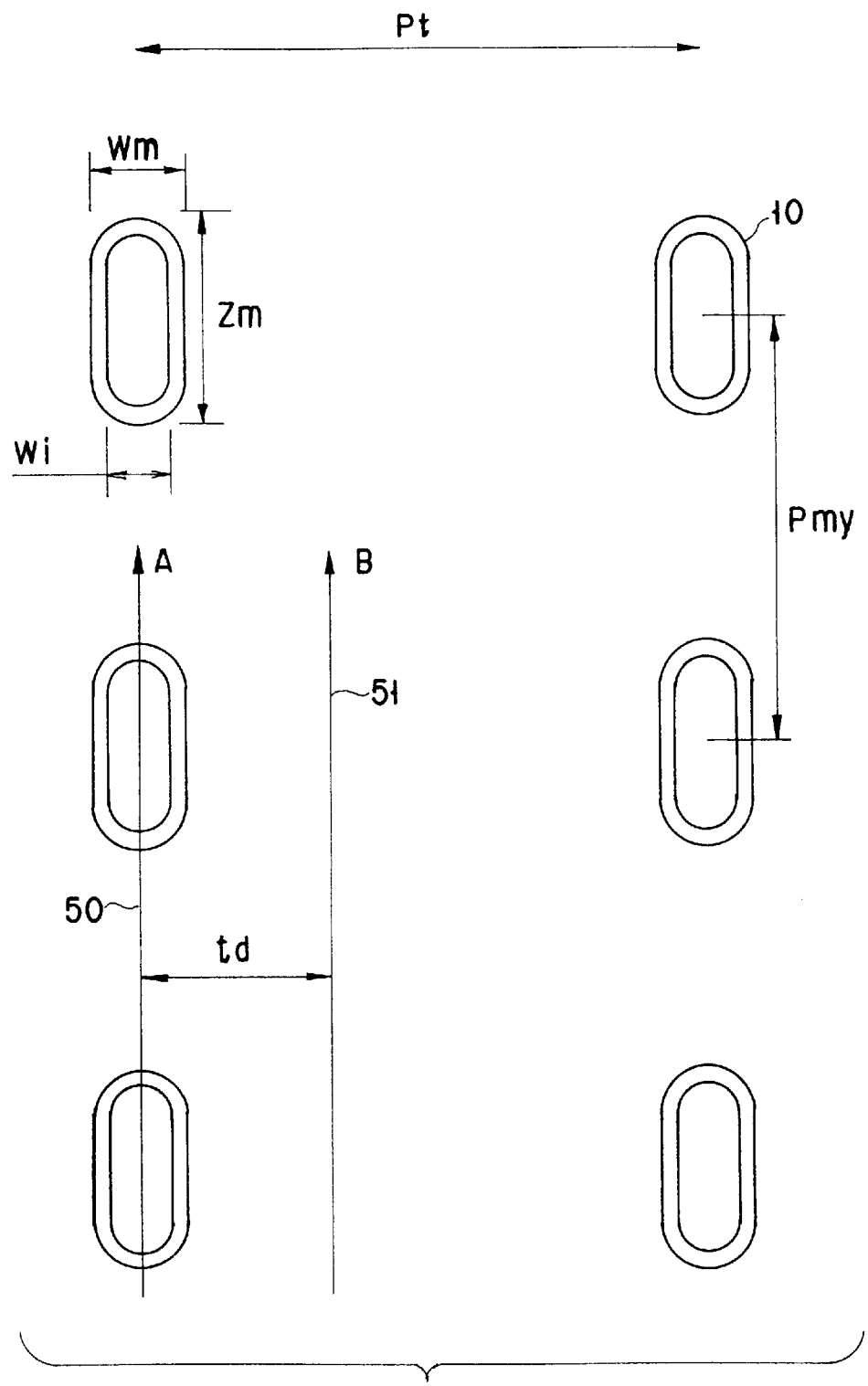
FIG. 5 is a diagrammatic view of the pit arrangement on the optical disk used to evaluate the MTF of the reproduction optical system and cross talk between adjacent tracks.

FIG. 5 diagrammatically shows an MTF of the reproduction optical system and the pit arrangement on the optical disk used to evaluate cross talk between adjacent tracks. In the figure, the spots 50 and 51 of the reproduction light beam represent a spot at the center (A) of a pit and a spot passing through position (B) a distance of td away from the center of a pit. MTF is expressed by the power of the basic frequency component of the output signal from the photosensor obtained when the beam spot passes through the center of a pit. Cross talk is expressed by the power of the basic frequency component of the output signal from the photosensor obtained when the beam spot passes through position B.

Figure 6:
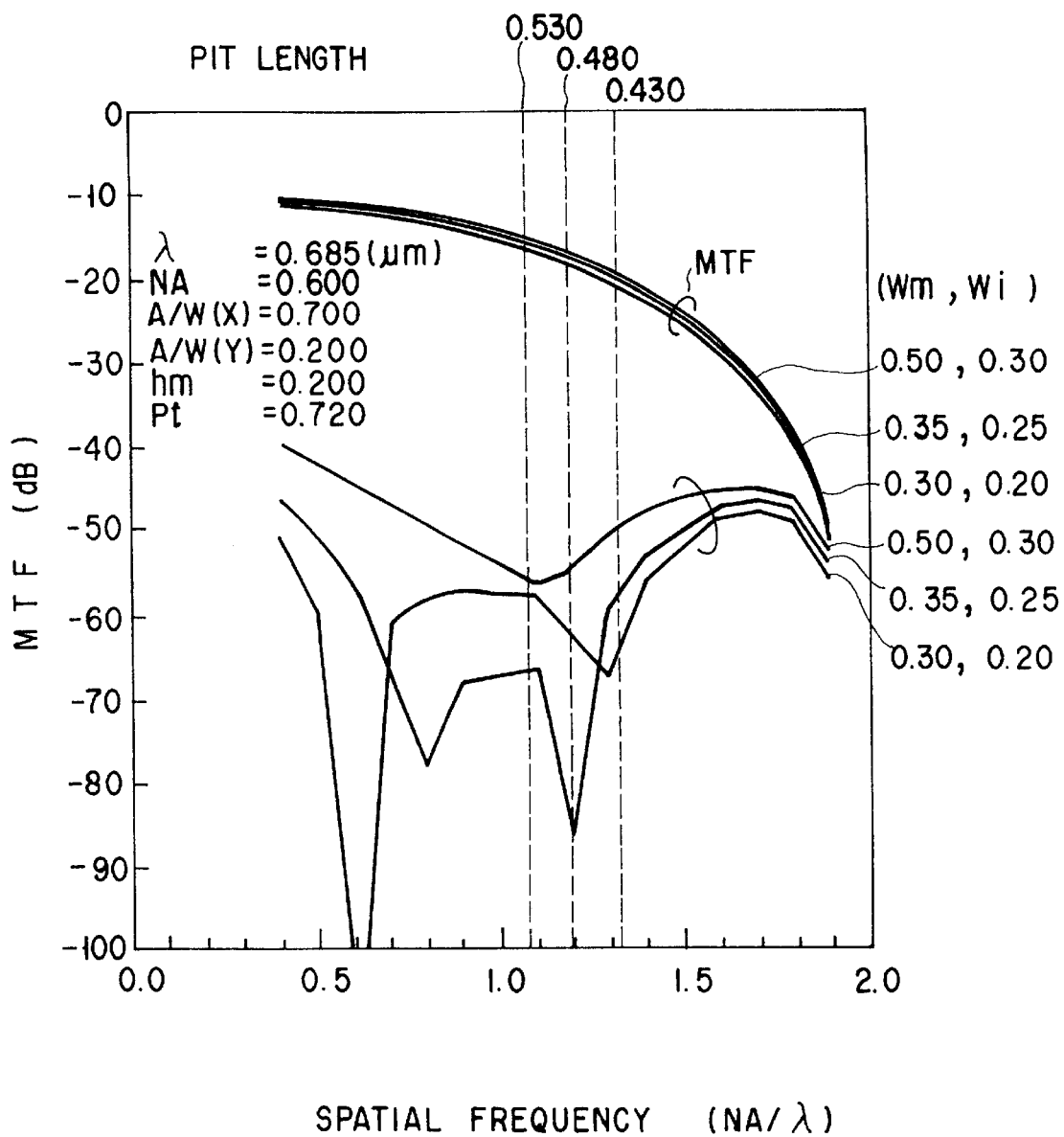
FIG. 6 shows the dependence of the reproduction optical system's MTF and the characteristics of cross talk between adjacent tracks on the pit shape when the upper width Wm and lower width Wi of the pit are changed variously.

FIG. 6 shows the MTF and the cross talk characteristics when the track pitch Pt is fixed at 0.72 μm, the depth hm of the pit 10 is fixed at 0.2 μm, and the upper width Wm and lower width Wi of the pit 10 are changed variously, with the spatial frequency on the abscissa and MTF and cross talk on the ordinate. The values of beam packing factors A/W(X) and A/W(Y) of the reproduction light beam across the track width (X) and along the track (Y) are shown in the figure. In the figure, the MTF produces a difference of 1 to 2 dB depending on the pit shape, which is not too large. In contrast, it can be seen that cross talk changes greatly with the pit shape.

Figure 7:
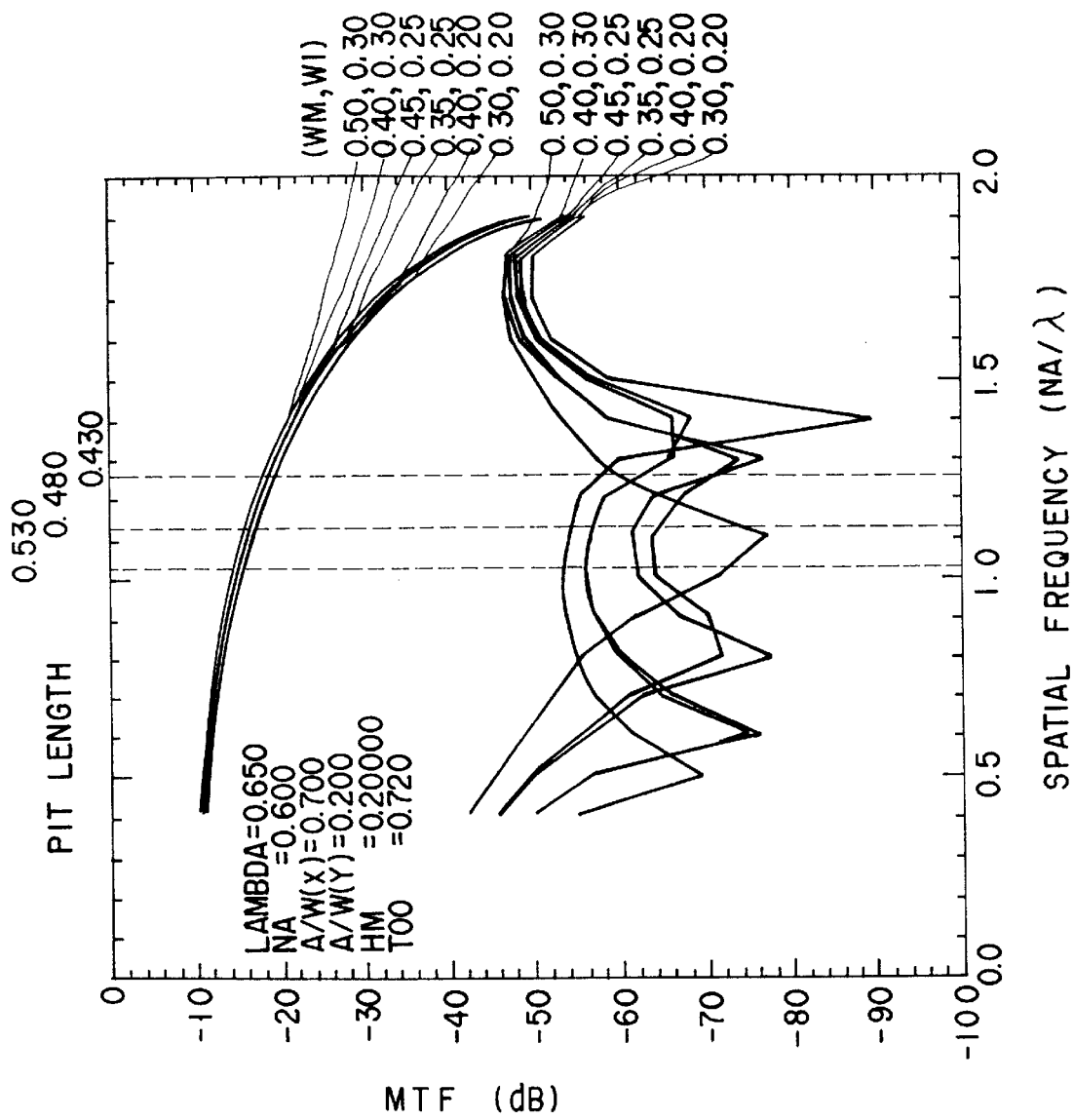
FIG. 7 shows the dependence of the reproduction optical system's MTF and the characteristics of cross talk between adjacent tracks on the pit shape when the conditions are the same as in FIG. 6 except that $\lambda$ is set at 0.650 $\mu$m.

FIG. 7 shows the MTF and the cross talk characteristics under the same conditions as in FIG. 6 except that λ is set at 0.650 μm.

FIG. 8 shows the MTF and the cross talk characteristics when the track pitch Pt is fixed at 0.72 μm, the depth hm of the pit 10 is fixed at 0.2 μm, and the upper width Wm and the angle θ of the inner wall 11 of the pit 10 are varied, with the spatial frequency on the abscissa and MTF and cross talk on the ordinate. The values of beam packing factors A/W(X) and A/W(Y) of the reproduction light beam across the track width (X) and along the track (Y) are shown in the figure.

FIG. 9 shows the MTF and the cross talk characteristics under the same conditions as in FIG. 8 except that the upper width Wm of the pit 10 is fixed at 0.35 μm and only the angle θ of the inner wall 11 of the pit 10 is changed variously.

It is assumed that RLL (Run-Length Limited) scheme are used as a modulation scheme of information recorded on the optical disk. It is necessary in this scheme to pay attention to cross talk due to low frequency components when the longest pit is sensed.

Figure 10:
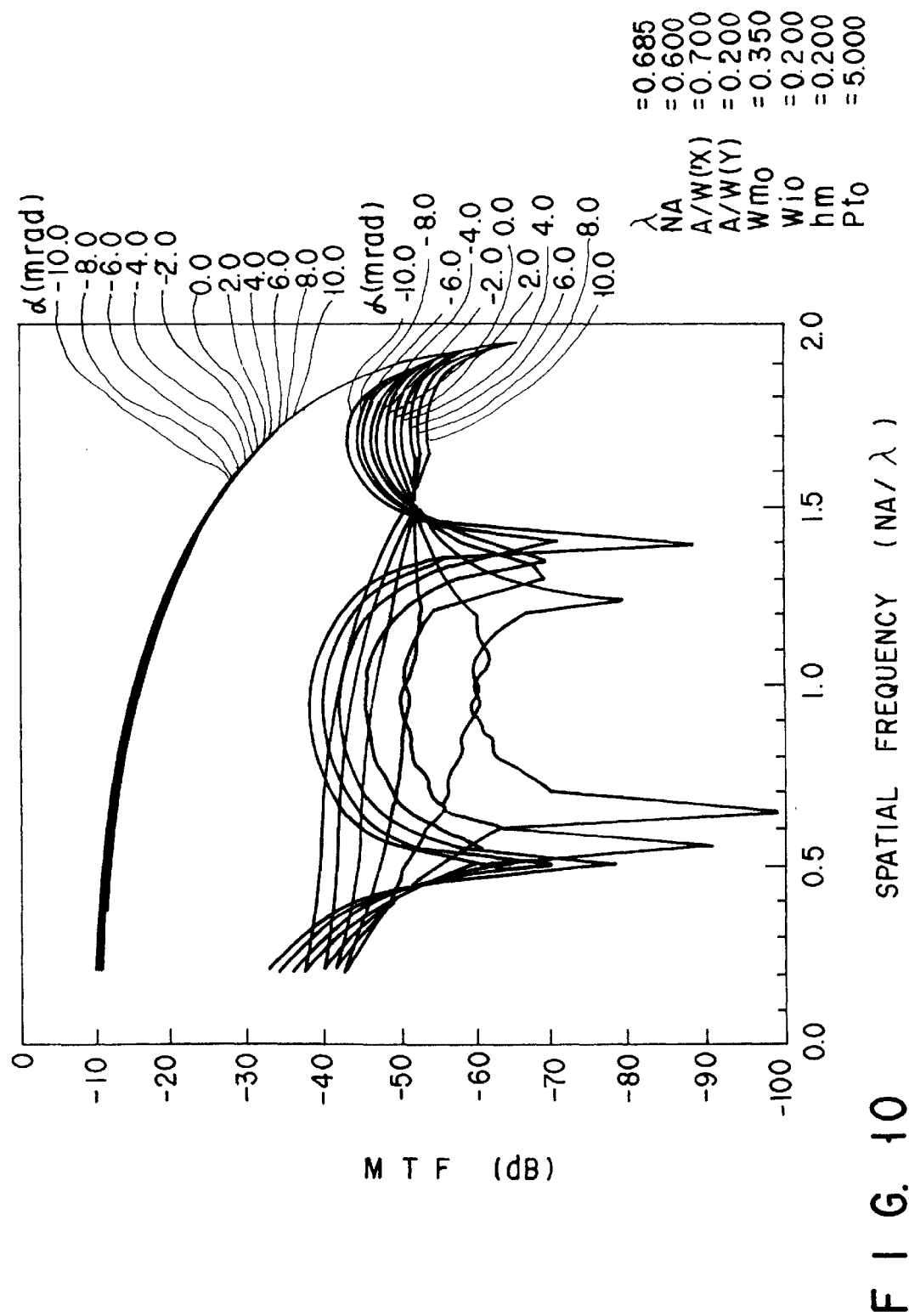
FIG. 10 shows the dependence of the reproduction optical system's MTF and the characteristics of cross talk between adjacent tracks on the tilt.

Although the cross talk characteristics shown in FIGS. 6 to 9 are for no tilt, tilts actually have to be taken into account. FIG. 10 shows the MTF and the cross talk characteristics when tilts are taken into account. As can be seen from the figure, when tilts are taken into account, the MTF almost remains unchanged, but the amount of cross talk increases, and the conditions for determining the parameters of a pit become more strict.

In the system design of an optical disk apparatus, if a tilt due to the warp of the optical disk itself and a tilt due to the apparatus are considered to be 5 mrad and 3 mrad, respectively, a tilt of about 8 mrad in total must be tolerated. According to the simulation in FIG. 10, the amount of cross talk can be suppressed to values less than −20 dB required in practical use in the tilt range of ±10 mrad for the same spatial frequency. This shows that a wavelength of 0.685 μm and a track pitch of 0.72 μm are reasonable.

The evaluation of FIGS. 6 to 9 shows that the amount of cross talk (the difference in MTF value between the MTF characteristic and the cross talk characteristic) is 20 dB or less until Wm=0.45 μm in the case where the track pitch shown in FIGS. 6 and 8 is 0.72 μm. In contrast, when Wm=0.5 μm, the amount of cross talk at low frequencies increases rapidly, exceeding −20 dB. The MTF characteristics are relatively good until Wm=0.3 μm, but deteriorates sharply when Wm is less than 0.3 μm. Therefore, the range of Wm=0.3 μm to 0.45 μm is reasonable.

The results mentioned above show that when the pit shape across the track width is standardized with a wavelength of 0.685 μm and NA=0.6 (i.e., (λ/NA)=1.14), it is desirable that the upper width of a pit should be (0.3 to 0.45)×(λ/NA)/1.14 μm, and the lower width of the pit should be (0.2 to 0.25)×(λ/NA)/1.14 μm, or that the upper width Wm should be (0.3 to 0.45)×(λ/NA)/1.14 μm and the angle θ of the inner wall should be in the range of 50° to 70°. Specifically, when the track pitch Pt is selected in the range of (0.72 to 0.8)×(λ/NA)/1.14 μm and the track pitch is made smaller than the beam spot diameter of the reproduction light beam, selecting the upper width Wm and lower width Wi of the pit or the upper width Wm of the pit and the angle θ of the inner wall in the above ranges enables the amount of cross talk to be suppressed to values less than −20 dB required in practical use in the tilt range of ±10 mrad expected in an actual optical disk apparatus, thereby achieving a remarkable improvement in the recording density. As a result, by combining these track pitch and pit shape, the laser diode with a wavelength of 0.685 μm, for example, as mentioned earlier, the 0.6 mm thick substrate, the object lens with NA=0.6, the subject of recording two hours of compressed moving-picture information by MPEG with the CD size can be achieved easily.

Figure 15:
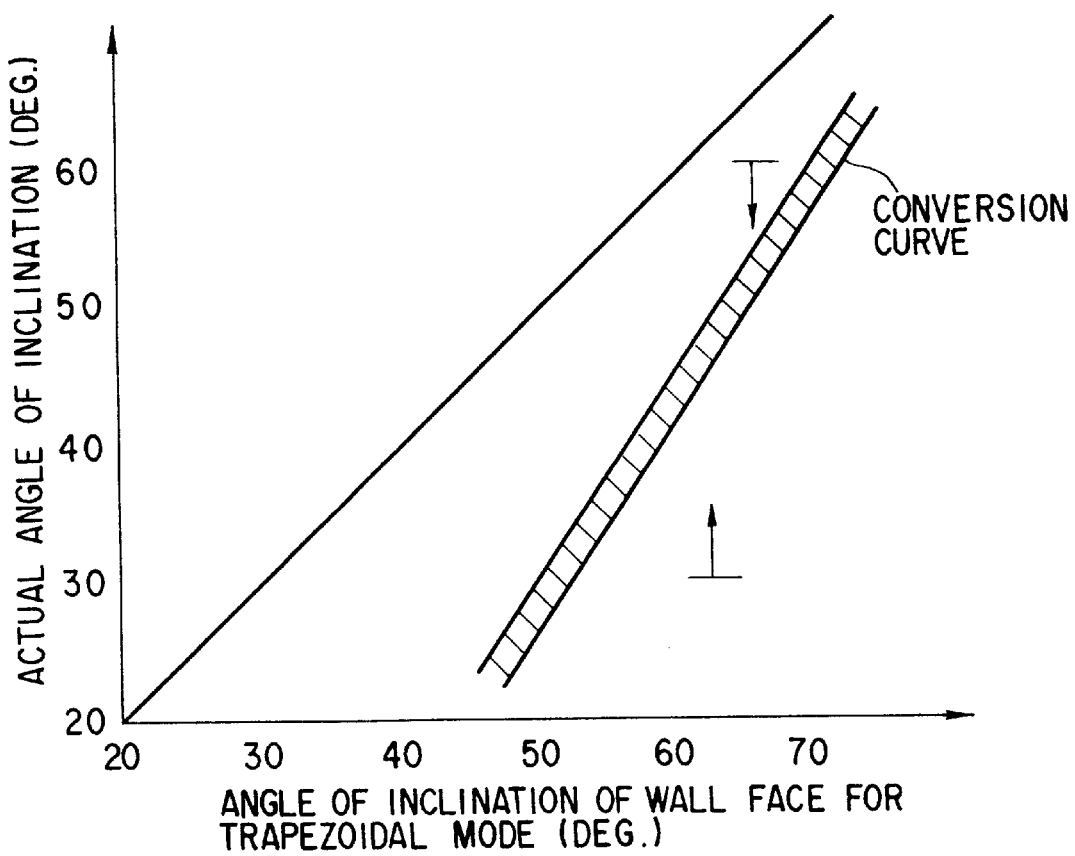
FIG. 15 shows a relationship between an angle of inclination of an actual pit and that of a model pit.

The parameters used in the explanation of the invention are obtained through calculations on the assumption that the pit is in the form of an ideal trapezoid. Actually, however, the pit does not take the form of an accurate trapezoid, but curves at its corners as shown in FIG. 13. Therefore, the parameters for the ideally trapezoidal pit, or the model pit, differ from those for the actual pit. FIG. 14 shows the difference between the bottom groove width wi and the top groove width wg for the model pit and the actual pit. As seen from FIG. 14, the value of wi for the model pit ranges from 0.2 to 0.32 μm; the value of wg for the model pit ranges from 0.3 to 0.45 μm, whereas the value of wg for the actual pit varies from 0.3 to 0.5 μm. Furthermore, the angle of inclination θ of the pit is as follows. As shown in FIG. 15, an angle of inclination of the mode pit is in the range of 50° to 70°, whereas that of the actual pit in the range of 30° to 60°.

Hereinafter, the structure of an optical disk according to the present invention will be described. FIGS. 16A and 16B are a perspective view and sectional view of a double-sided optical disk 100, respectively. One surface of each of transparent substrates 101 and 102 is embossed with pits made of light-transmitting resin such as polycarbonate or acrylic resin and is coated with a reflecting film 103 and a reflecting film 104 (e.g., of aluminum), respectively. On these films, protective films 105 and 106 are formed. The thickness of the transparent substrates 101 and 102 is 0.6 mm. The transparent substrates 101 and 102, whose protective films 105 and 106 are allowed to face each other, are laminated together with an adhesion layer 107 with a thickness of several tens of μm made of a thermoset adhesive. In the center of the optical disk 100, a hole 108 is made for clamping. Around the hole, a clamping zone 109 is provided. A reproduction light beam 110 is emitted from a laser diode (not shown), passes through the reproduction optical system, enters an optical disk 100 via an object lens 111 from the transparent substrates 101 and 102, and is focused as a small beam spot on the reflecting films 103 and 104.

Figure 17:
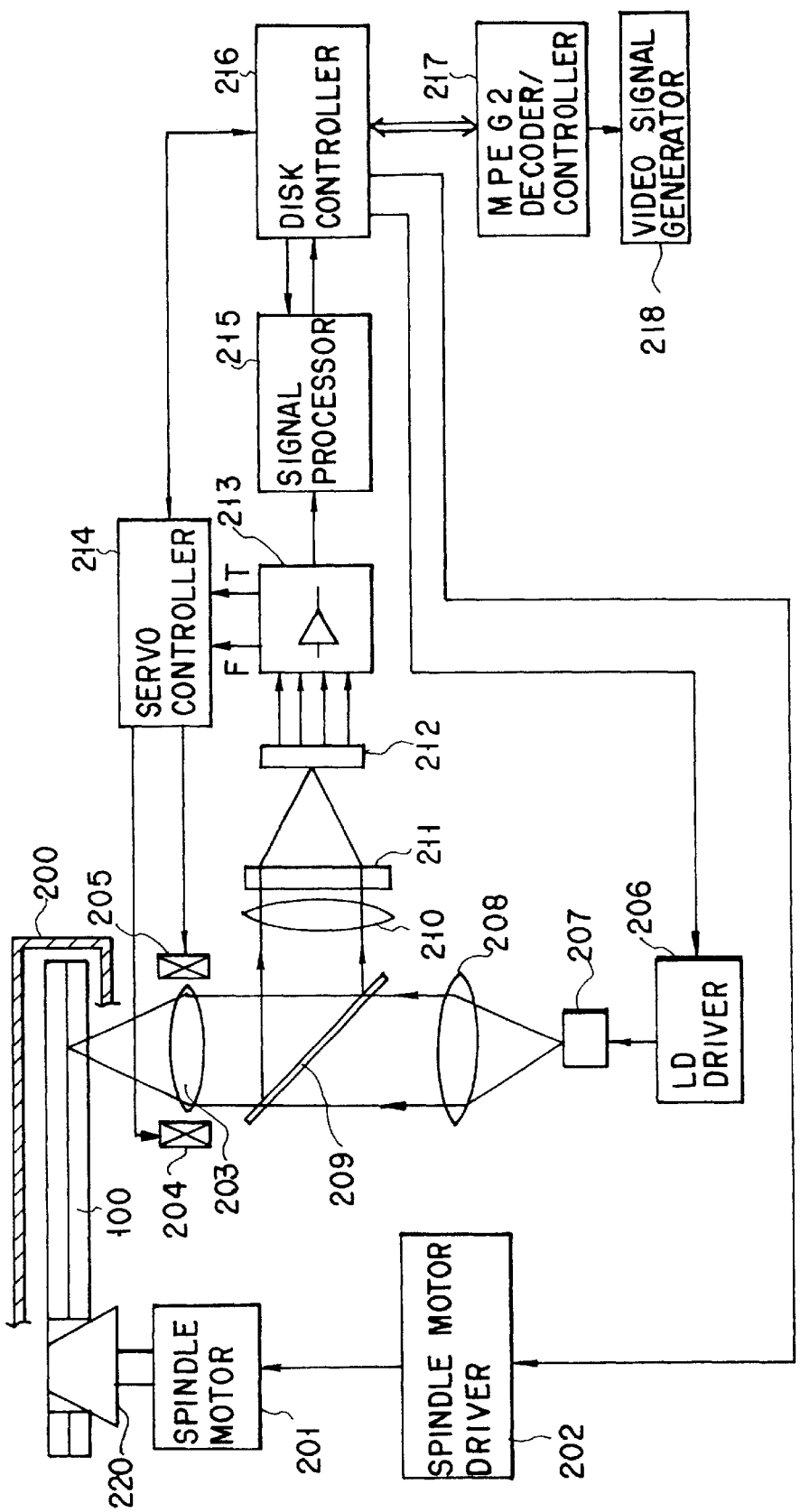
FIG. 17 is a block diagram of an optical disk apparatus according to an embodiment of the present invention.

FIG. 17 shows an example of an optical disk apparatus which reproduces compressed moving-picture information by using the above-mentioned optical disk 100. Because the optical disk 100 uses the substrates 101 and 102 which are as thin as 0.6 mm and consequently are less immune to dust or dirt on their surfaces than a CD using a 1.2 mm thick substrate, the disk 100 is housed in a cartridge 200. By housing the optical disk 100 in the cartridge 200, attention need not be paid to the way of holding the disk, dust, fingerprints, etc. as with CDs, which is helpful in handling and carrying. When the disk is exposed as is a CD, the ability to correct errors must be determined, taking into account an unexpected accident such as a flaw. Use of the cartridge 200, however, makes such a consideration unnecessary. Therefore, it is possible to use the LDC read Solomon error correction technique in sectors as used in a recordable optical disk. As a result of this, for example, when an optical disk is formatted in units of 2 kbyte to 4 kbyte, the recording efficiency can be increased by more than 10% as compared with the CD.

When the 4/9 modulation method is used as a modulation method for the information recorded on the optical disk 100, the track pitch on the optical disk 100 is 0.72 μm, and the pit pitch is 0.96 μm, it is expected that the pit density ratio is 3.84 times as high as the conventional CD format, the modulation efficiency is increased by 20%, and the format efficiency is increased by 10%. Consequently, the capacity can be expected to increase by a total of 5.1 times. As described earlier, when moving-picture information such as a movie is reproduced with a picture quality as high as S-VHS, this requires a rate of 4.5 Mbps including sound, so that the capacity required for two hours of reproduction is 4 Gbyte. Because of the aforementioned capacity increase by 5.1 times, the 4-Gbyte capacity can be realized on one side of the disk. Furthermore, as shown in FIGS. 16A and 16B, a single double-sided optical disk alone enables four hours of recording at a maximum.

In FIG. 17, the optical disk 100 is chucked by a tapered cone 220 and rotated by a spindle motor 201. The spindle motor 201 is driven by a spindle motor driver circuit 202. The reproduction optical system is constructed as follows.

An objective lens 203 is placed so as to face the optical disk 100. The objective lens 203 can be moved along the optical axis by a focus coil 204 and across the track width by a tracking coil 205. The wavelength of a laser diode 207 driven by a laser diode (LD) driver 206 is 0.685 $\mu$m. The light beam emitted from the laser diode 207 is made into parallel luminous flux by a collimate lens 208 and then enters a polarization beam splitter 209. The light beam emitted from the laser diode 207 has generally an elliptic far field pattern. Therefore, when a round pattern is needed, a beam shaping prism has only to be placed after the collimate lens 208. The light beam passed through the polarization beam splitter 209 is focused by the objective lens 203 onto the optical disk 100.

The light reflected by the reflecting film on the optical disk 100 passes back through the objective lens 203 in the opposite direction to the incident light beam, is reflected by the polarization beam splitter 209, and enters a photosensor 212 via the sensing optical system composed of a condenser lens 210 and a cylindrical lens 211. The photosensor 212, for example is a 4-quadrant photosensor. The four sense outputs of the photosensor are input to an amplifier array 213 containing an amplifier and an adder-subtracter, which produces a focus error signal, tracking error signal, and reproduced signal. The tracking error signal is obtained by, for example, a push-pull technique in the form of a push-pull signal as described earlier. The focus error signal and tracking error signal are supplied to the focus coil 204 and the tracking coil 205 via a servo controller 214. As a result of this, the objective lens 203 is moved along the optical axis and across the track width, thereby focusing the light beam onto the surface of the reflecting film serving as the recording surface of the optical disk 100, and tracking the target track.

The reproduced signal from the amplifier array 213 is input to a signal processing circuit 215, which binarizes the input and then senses data pulses. The sensed data pulses are inputted to a disk controller 216, which decodes the format, corrects errors, and then supplies the resulting signal as a bit stream of moving-picture information to an MPEG2 decoder/controller 217. Because the data obtained by compressing (encoding) the moving-picture information according to the MPEG2 standards is recorded on the optical disk 100, the MPEG-2 decoder/controller 217 expands (decodes) the bit stream input to reproduce the original moving-picture information. The reproduced moving-picture information is supplied to a video signal generator circuit 218, which adds a blanking signal etc. to produce a video signal in a specific television format. The techniques related to MPEG2 have been disclosed in U.S. Pat. No. 5,317,397 and U.S. patent application Ser. No. 08/197,862.

As explained above, the optical disk according to the present invention has such an optimal pit shape (the upper and lower widths of a pit or the upper width of a pit and the angle of the pit's inner wall) as makes it possible to set the track pitch to a smaller value than the spot diameter of the reproduction light beam and decrease cross talk between adjacent tracks to a level required for practical use. As a result, with the optical disk, the track density can be made by about 1.5 times as high as the conventional CD and the sufficient levels of the reproduced signal and the push-pull signal used for tracking can be assured.

Accordingly, with the present invention, as shown in the embodiments described above, the capacity about five times that of the conventional CD can be realized even using the normal CD size, for example. In addition, 4 Mbps of compressed moving-picture information with a picture quality as good as that of a high quality VTR, including sound, can be stored for two hours, which is very useful in practical use.

In the above-described embodiment, the values of a track pitch and upper and bottom widths in a pit are set as ones obtained by multiplying $\lambda$/NA ($\lambda$:wavelength ($\mu$m) and NA: numerical aperture of objective lens) by proportional coefficients within ranges respectively set in correspondence with $\lambda$/NA and the numerical aperture. This makes it possible to set a parameter suitable for recording information at high density without depending on a wavelength of light to be used or a numerical aperture of an objective lens.

However, a condition in the embodiment is set on the basis of the condition that aberration generated by inclination of a disk is equivalent to a wavelength as a reference. This will be described in detail by referring to FIG. 18.

Figure 18:
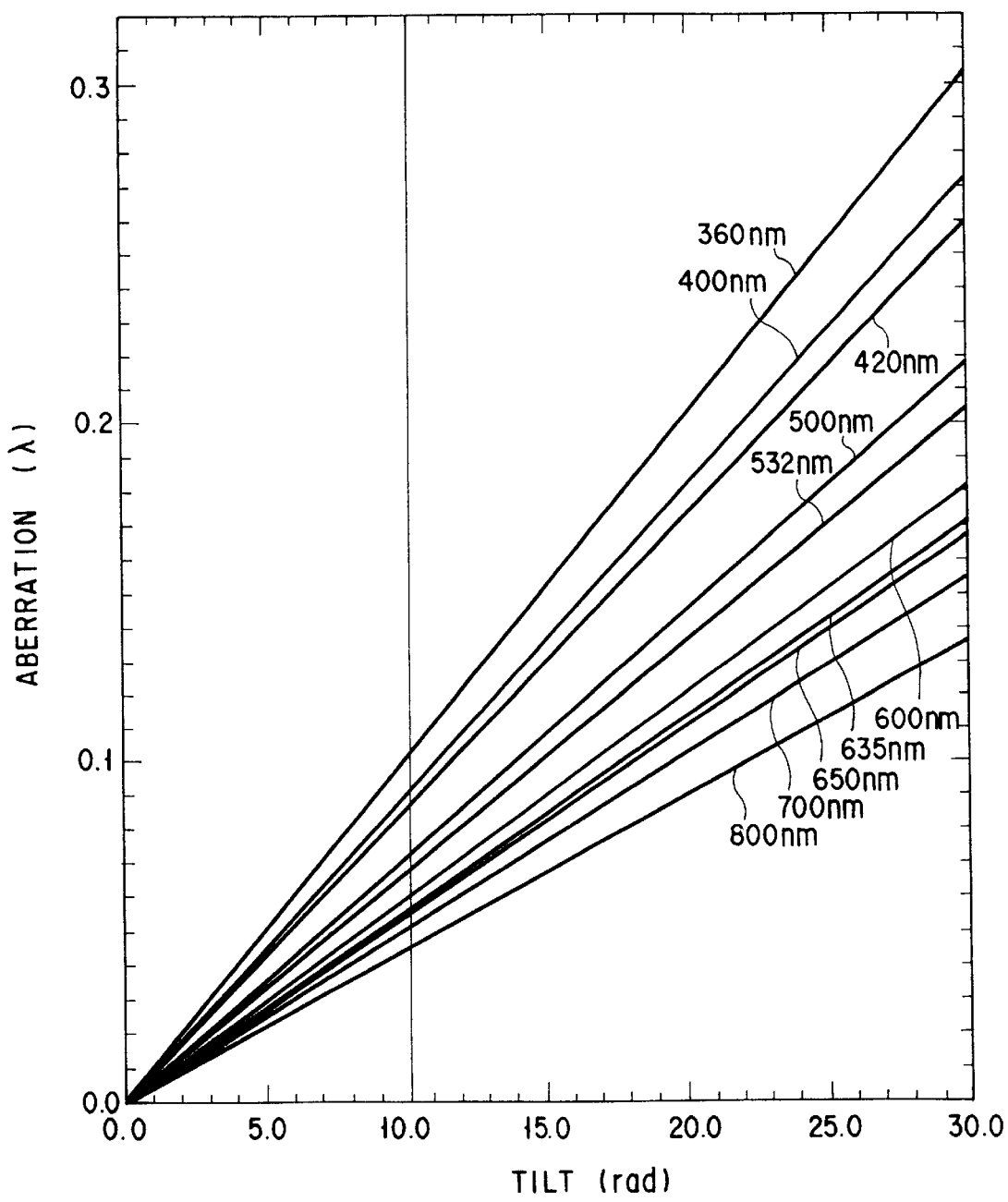
FIG. 18 is a graph showing a relationship between inclination of a disk and aberration.

FIG. 18 shows a result of calculating aberration generated by inclination of a disk with respect to several wavelengths. A abscissa indicates disk tilt angles (mrad) in a radial direction while an ordinate indicates aberration rms (root mean square) values by wavelength units. The aberration rms values are nearly proportional to the disk tilt angles while inversely proportional to wavelengths. In parts in which the tilt angle is smaller than 20 mrad, the aberration rms value, that is, Wrms, is obtained by the following expression:

$$\text{Wrms}=3.58\times10^{-3}\ \theta(\text{mrad})/\lambda(\mu\text{m})$$

For instance, when a wavelength is 0.65 $\mu$m and a disk tilt angle is 10 mrad, Wrms=0.0551 $\lambda$.

The condition in the above-described embodiment is a value obtained on the basis of the condition that an allowable tilt angle of 10 mrad is given when a wavelength is in the vicinity of 0.65 $\mu$m. This means, in other words, that a tilt angle of 10 mrad is allowed with respect to a wavelength in the vicinity thereof, and in case where light of a shorter wavelength is used, an allowable tilt angle is made smaller. This relationship is represented by the following expression:

$$\theta(\text{mrad})=15.4\ \lambda(\mu\text{m})$$

To explain this by referring to FIG. 18, if there is disk inclination of 10 mrad with a wavelength of 0.65 $\mu$m, an aberration rms value is 0.0551 $\lambda$. As an example, in case where light generated by SHG (Second Harmonic Generation) combining YVO4 and KTP, a wavelength thereof is 0.532 $\mu$m. However, in order to limit aberration to the same rms value as in the case of the above-described condition, that is, 0.0551 $\lambda$, at this time, a disk tilt angle to be allowed is 8.2 mrad. When a wavelength is shortened to 0.42 μm or 0.36 μm by using materials such as GaN and the like, a tilt angle to be allowed is further reduced to 6.5 mrad or 5.5 mrad.

If recording density is to be improved in such a short wavelength, an allowable disk tilt angle is accordingly made smaller. Thus, a request for improvement in machine accuracy including accurate formation of a disk, accuracy of a spindle motor and a turntable, chucking accuracy of a disk, etc., will be stronger making it difficult to provide an inexpensive apparatus.

The preferred embodiment was devised in view of this situation and an optical disk apparatus having recording density as high as possible is provided without increasing a demand on machine accuracy. This optical disk apparatus achieves high recording density by keeping an allowable disk tilt angle constant, e.g. 10 mrad. In this case, since the amount of aberration generated in each wavelength at 10 mrad increases, in order to allow such an increase in aberration it is necessary to set a larger parameter used to set recording density for a track pitch and a detection window width. In FIG. 18, if wavelengths of light are set small, e.g. 0.532 μm, 0.42 μm and 0.36 μm, the amount of aberration generated at the disk inclination of 10 mrad gradually increases to 0.0673 λ, 0.0852 λ and 0.0994 λ. Allowing such large aberration correspondingly causes, if expressed in terms of an optical system of 0.65 μm, the allowable values of tilt angles to be such large ones as 12.3 mrad, 15.5 mrad and 18.1 mrad. This conversion is represented by the following expression based on the above-described proportional relationship between the amount of aberration and an allowable tilt angle:

$$\theta \text{ eq (mrad)}=6.5/\lambda \times (\mu m)$$

Here, θ eq indicates an angle at which aberration equivalent to that generated when there is inclination of 10 mrad in each wavelength is generated in the optical system of a wavelength 0.65 μm. This angle θ eq increases inversely proportional to the wavelength.

To allow such a large tilt angle, it is necessary to set the value of parameters for determining recording density, e.g., a track pitch, a detection window width and so on, at a value larger than that set proportionally to (λ/NA).

Figure 19:
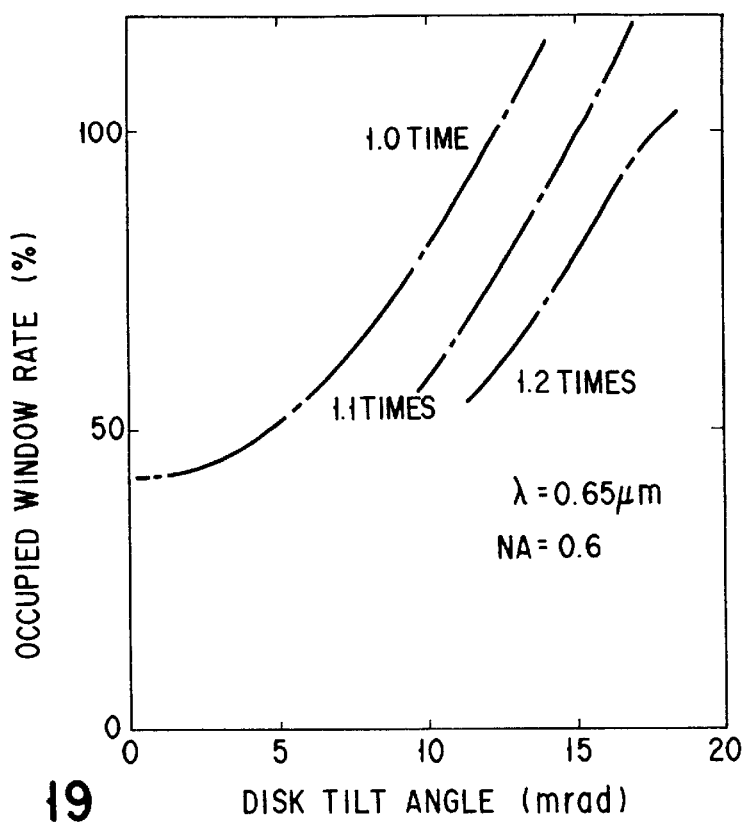
FIG. 19 is a graph showing a relationship between a disk tilt angle and a window occupation ratio.

FIG. 19 shows a relationship between disk tilt angles and window occupancy ratios. As typical values in the above-described embodiment, a wavelength is set at 0.65 μm, a numerical aperture at 0.6, a track pitch at 0.7525 μm, a pit upper width at 0.35 μm, a pit bottom width at 0.2 μm, a detection window width at 0.134 μm assuming that a modulated code scheme of d=2 (where d is the minimum run length of '0' for the RLL modulation code) is adopted and a pit depth at ⅕ of a value obtained by dividing a wavelength λ by a substrate refractive index n. A relationship between disk tilt angles and window occupancy ratios in this case is represented by a curve of (1.0 times). Curves of (1.1 times) and (1.2 times) are obtained when a track pitch, a pit upper width, a pit bottom width and a detecting window width are expanded respectively by 1.1 and 1.2 times. Though recording density declines to $1/1.1^2$ and $1/1.2^2$, disk tilt angles to be allowed increase instead.

In FIG. 19, window occupancy ratios indicated by an ordinate are values obtained by calculating reproducing signals based on the scalar diffraction theory, including a lower limit achievable when cross talk from an adjacent track is to be considered in addition to inter symbol interferences (ISI) by various pit patterns generated under the restrictions of modulated codes and in each case jitters are to be reduced by using an optimum equalizing circuit. It requires a great deal of time to calculate these window occupancy ratios and this is made possible only with the development of a calculation program based on high-speed algorithm. Also, since NA is large, even in calculation of aberration caused by inclination of a substrate, a more accurate evaluating method based on ray tracing is used rather than a usually used approximate expression.

Figure 20:
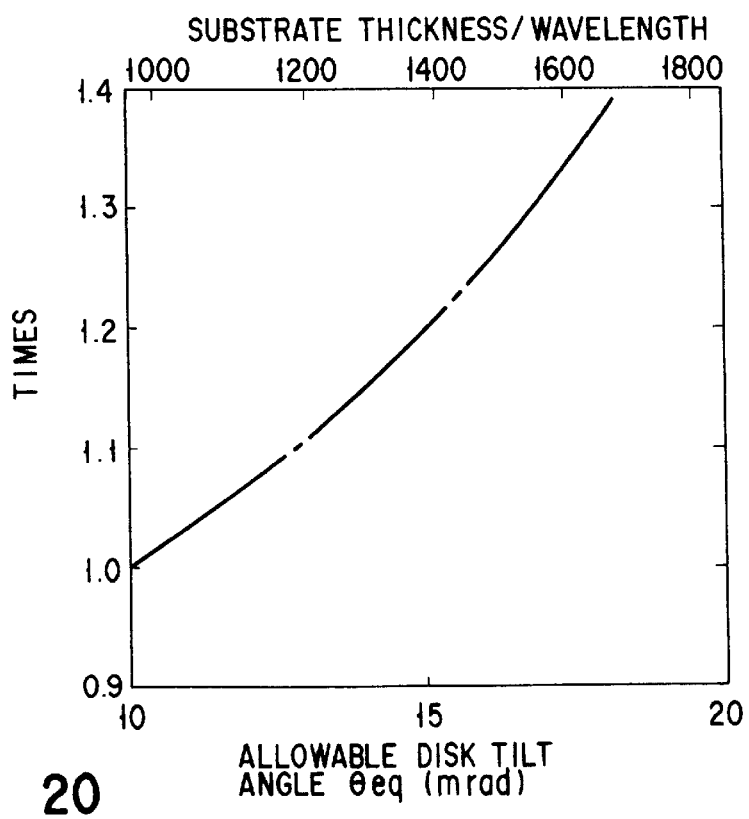
FIG. 20 is a graph showing a relationship among an allowable disk tilt angle, a ratio of (a substrate thickness/a wavelength) and multiplication ratios.

FIG. 20 is a view outgrown from FIG. 19 and obtained by plotting multiplication ratios necessary for allowable disk tilt angles with a window occupancy ratio of 80% as a reference.

According to the above-described preferred embodiment, a procedure for designing an optical disk apparatus is as follows:

First, by referring to FIG. 18, a determination is to be made on whether it is possible or not to set small an allowable value of a disk tilt angle so as to keep aberration within that obtained when a wavelength is 0.65 μm and a disk tilt angle is 10 mrad. If it is possible, parameters for a track pitch, a pit upper width, a pit bottom width and a detection window width may be determined based on the above-described embodiment. On the other hand, if it is impossible to set an allowable disk tilt angle so small, the value (0.08) of the amount of aberration to be allowed is read from a wavelength to be used (e.g. 0.42 μm) and an allowable disk tilt angle (e.g. 10.0 mrad) in FIG. 18, and in this amount of aberration (0.08) a disk tilt angle (15.0 mrad) corresponding to the amount of aberration obtained in an optical system in which a wavelength is 0.65 μm is to be considered as an allowable disk tilt angle therein. Then, a magnification ratio (1.2) necessary to realize this allowable disk tilt angle (15.0 mrad) is to be read from FIG. 20. Lastly, by multiplying each parameter value set according to the above-described embodiment by this multiplication ratio (1.2), it is possible to realize an optical disk capable of securing a practical disk tilt angle to be allowed even in a short wavelength.

Furthermore, in the description of the embodiment, thickness of a substrate was 0.6 mm. However, since aberration is proportional to thickness of a substrate, it is possible to set a parameter by calculating proportion when thickness of a substrate is one other than the above. For instance, if a substrate has thickness of 0.4 mm, a value of aberration is ⅔ times as that in FIG. 18 and thus aberration may be set according to this multiplication. In other words, as described above, since the amount of aberration is inversely proportional to a wavelength, if this condition is used, multiplication of substrate thickness by λ means that a wavelength is multiplied by 1/λ in terms of an aberration amount. Therefore, by performing conversion under this condition, it is possible to determine multiplication ratios with respect to parameters for a track pitch, a pit upper width and bottom width set according to the above-described embodiment as in the case of the procedure.

In case where thickness of a substrate is 600 μm and a wavelength is μm, as described above, a relationship, θ eq (mrad)=6.5/λ (μm), holds. In case where thickness of a substrate is ds μm, however, the following relationship holds:

$$\theta \text{ eq (mrad)}=6.5/\lambda \times (ds/600) \ (\mu m)=1.083\times10-2\times(ds/\lambda)$$

According to this relationship, a measure of an abscissa is added to the upper part of a graph at ds/λ in FIG. 20. The graph in FIG. 20 is made based on calculation taking a wavelength of 0.65 μm as an example. If the measure on the upper part is used, however, without performing conversion via parameters of a wavelength 0.65 μm scheme, it is possible to read necessary multiplication ratios by calculating proportion between a substrate and a wavelength which are actually used.

Further in detail, in the above-described embodiment, ranges of a track pitch, upper and bottom pit widths and depth are set in the following way:

Track pitch: (0.72 to 0.8)×( $\lambda$/NA)/1.14 $\mu$m
Upper width: (0.3 to 0.5)×($\lambda$/NA)/1.14 $\mu$m
Bottom width: (0.2 to 0.32)×($\lambda$/NA)/1.14 $\mu$m
Depth: (1/4.2×$\lambda$/n) to (1/5.2×$\lambda$/n)

These parameters are values when a wavelength is 0.65 $\mu$m, and if a wavelength of used laser light is shorter than this, these parameters are multiplied by $\alpha$. That is, coefficients are respectively multiplied by $\alpha$ as in the following expression:

Track pitch: (0.72 to 0.8)$\alpha$×($\lambda$/NA)/1.14 $\mu$m
Upper width: (0.3 to 0.5)$\alpha$×($\lambda$/NA)/1.14 $\mu$m
Bottom width: (0.2 to 0.32)$\alpha$×($\lambda$/NA)/1.14 $\mu$m
Depth: (1/4.2×$\lambda$/n) to (1/5.2 $\lambda$/n).

This multiple can be read from the graph in FIG. 20. However, an approximate expression like the following may be applied to designing. That is, if an abscissa indicates allowable disk tilt angles $\theta$ eq (mrad) expressed in terms of 0.65 $\mu$m and an ordinate indicates dimensional multiplication ratios $\alpha$, $\alpha$ is represented by the following expression:

$$\alpha = 0.002236 \times \theta \text{ eq}2 - 0.01575 \times \theta \text{ eq} + 0.934$$

If by using substrate thickness ds and a wavelength $\lambda$ this expression of $\alpha$ is replaced by the above-described expression, that is, $$\theta \text{ eq (mrad)} = 1.083 \times 10^{-2} \times (ds/\lambda)$$

$\alpha$ is a value obtained by the following expression:

$$\alpha = 2.623 \times 10^{-7} \times (ds/\lambda)^2 - 1.706 \times 10^{-4} (ds/\lambda) + 0.934$$

According to this expression, an optimum multiplication ratio when substrate thickness and a wavelength are both changed can be obtained as a function therebetween.

The above embodiment sets the allowable tilt angle at 10 mrad. However, the present invention can be applied to another tilt angle. In this case, $\theta$ eq and $\alpha$ are represented by the following expressions.

$$\theta \text{ eq (mrad)} = 1.083 \times 10^{-2} \times (d/\lambda)$$

where $\theta$A (mrad): allowable tilt angle.

$$\alpha = 2.623 \times 10^{-7} \times (\theta A \, ds/\lambda)^2 - 1.706 \times 10^{-4} (\theta A \, ds/\lambda) + 0.934.$$

In recent years, the improvements in the tilt servo technology have enabled the tilt angle to be close to 0 mrad. It is obvious that the recording density will become higher in accordance with a decrease in the tilt angle. Described below is an embodiment wherein $\alpha$ is determined when the tilt angle is as narrow as 10 mrad or less.

In view of the case where the wavelength $\lambda$ is 0.65 ($\mu$m) and the thickness ds of the substrate is 600 ($\mu$m), a system wherein the residual tilt angle is about 7 mrad or less should be preferably designed based on a newly formula. More specifically, a system wherein the tilt angle is so suppressed as to make the value of ($\theta$A ds/$\lambda$) smaller than 6500 or so, should be preferably designed based on the new formula below. In the formula, the unit of $\theta$A is mrad, and the units of ds and $\lambda$ are $\mu$m.

$$\alpha = 3.617 \times 10^{-14} \times (\theta A \, ds/\lambda)^3 + 1.248 \times 10^{-9} \times (\theta A \, ds/\lambda)^2 + 0.865$$

Figure 21A:
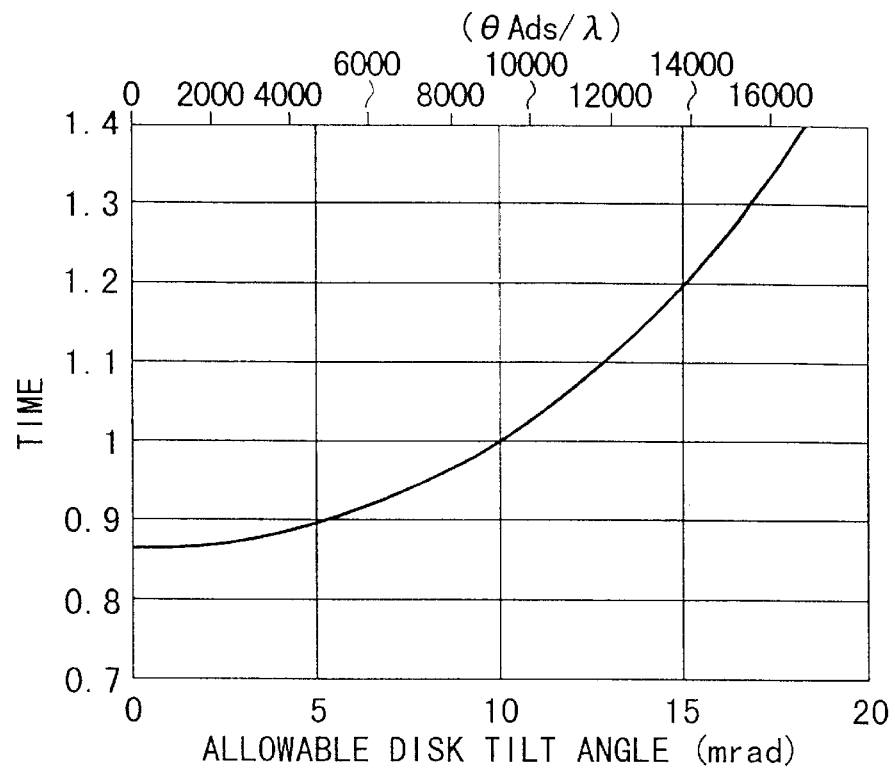
FIGS. 21A and 21B are graphs showing a relationship between allowable tilt angle and a time.
Figure 21B:
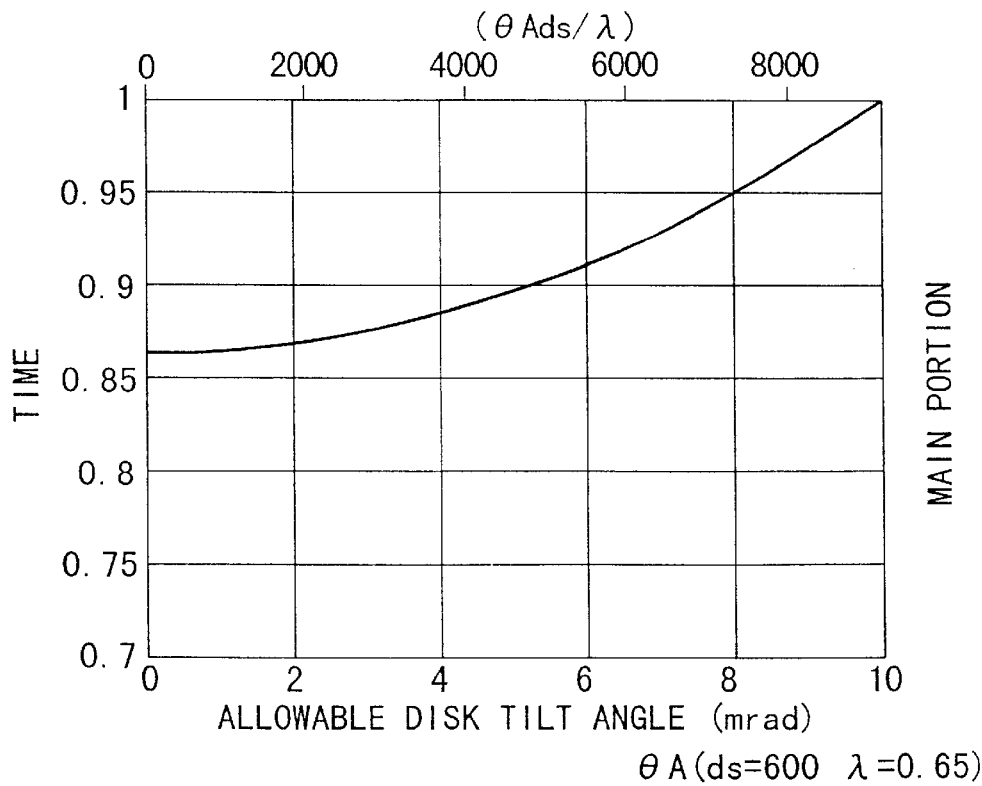

FIGS. 21A and 21B are graphs showing how the allowable tilt angle based on the above new formula is related to the magnification. In the graphs, the abscissa represents the allowable tilt angle $\theta$A(mrad) which is effective when the wavelength $\lambda$ is 0.65 ($\mu$m) and the thickness ds of the substrate is 600 ($\mu$m), while the ordinate indicates the value of $\alpha$. According to the new formula set forth above, the value of $\alpha$ is 0.865 when the abscissa ($\theta$A) is 0.

As shown in FIG. 21A, the curve described by the value of $\alpha$ is similar to that shown in FIG. 20 when the title angle $\theta$A is over 10 (mrad). When the title angle becomes less than 10 (mrad), the value of a decreases as shown in FIG. 21B.

The target specifications of a high definition DVD are that the wavelength $\lambda$ is 0.410 ($\mu$m), the numerical aperture NA is 0.6, the track pitch Pt is 0.4 ($\mu$m), and the thickness ds of the substrate is 600 ($\mu$m). To check whether those target specifications are satisfied by the new formula described above, the value which Pt takes when the title angle $\theta$A is 0 is calculated based on ($\alpha$=0.865).

$$Pt = (0.72 \text{ to } 0.8) \times \alpha \times (\lambda/NA)/1.14 \, (\mu m) = (0.72 \text{ to } 0.8) \times 0.865 \times (0.410/0.6)/1.14(\mu m) = 0.37 \text{ to } 0.41$$

As can be seen from this, one of the target specifications, namely, (Pt=0.4 $\mu$m), is attained.

Next, a case where the residual tilt angle is 4 mrad or so will be described on the assumption that $\theta$A=4 mrad, $\lambda$=0.41 $\mu$m, and ds=600 $\mu$m.

$$(\theta A \, ds/\lambda) = 4 \times 600/0.41 = 5853$$

$$\alpha = 3.617 \times 10^{-14}(5853)^2 + 1.248 \times 10^{-9} \times (5853)^2 + 0.865 = 0.915$$

When $\theta$A=4 mrad (i.e., when $\alpha$=0.915), Pt is calculated as follows:

$$Pt = (0.72 \text{ to } 0.8) \times \alpha \times (\lambda/NA)/1.14 \, (\mu m) = (0.72 \text{ to } 0.8) \times \mathbf{0.915} \times (0.410/0.6)/1.14 \, (\mu m) = 0.39 \text{ to } 0.44$$

Accordingly, one of the target specifications, namely, (Pt=0.4 $\mu$m), is attained.

As a tilt servo mechanism for executing the tilt angle correction, the following apparatus can be employed.

Figure 22A:
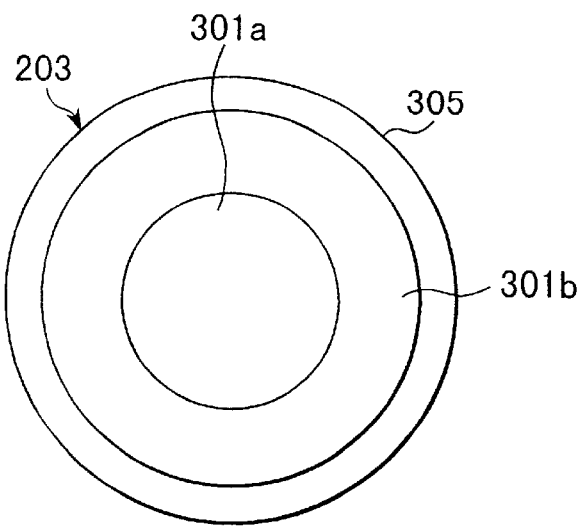
FIGS. 22A and 22B show a plane view and sectional view of a lens used for a tilt servo mechanism, respectively.
Figure 22B:
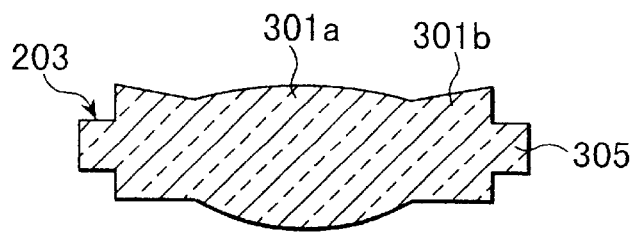

As shown in FIGS. 22A and 22B, the objective lens 203 comprises a central portion 301a made of an ordinary lens, and a circumferential portion 301b made of an annular prism. The central portion 301a of the objective lens 203 is for focusing a light beam used for record and/or reproduction (the light beam will be referred to as a record/reproduction light beam), while the circumferential portion 301b is for the radiation of a tilt detecting optical beam used for detecting a tilt of an optical disk 10 with reference to the optical head (the tilt will be hereinafter referred to simply as a disk tilt).

Part of the light beam emitted from a semiconductor laser light source 207 is focused by the central portion 301a of the objective lens 203 and radiated onto an information recording surface 321 as a record/reproduction light beam. The other part of the light beam, which is not used as the record/reproduction light beam and is therefore an optical loss in the prior art, passes through the circumferential portion 301b of the objective lens 203 and falls on the information recording surface 321 as a collimated tilt detecting optical beam. The optical beam radiated onto the information recording surface 321 is reflected thereby, and the reflected beam passes through the central portion 301a of the objective lens 203 in the opposite direction and is guided to a half mirror 209. After being reflected by the half mirror 209, the optical beam passes through a detection optical system including a condenser lens 210, a cylindrical lens 211, etc., and then enters a photo detector 315 having a disk tilt detecting function.

Figure 23A:
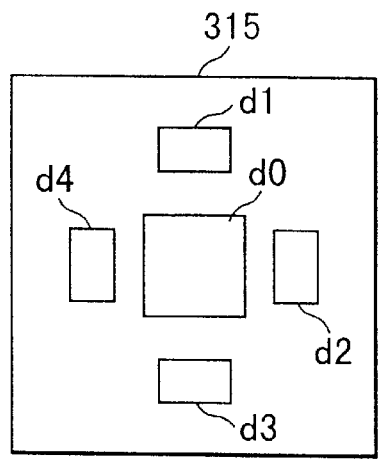
FIGS. 23A and 23B shows a structure of an optical detector having a tile detecting function.
Figure 23B:
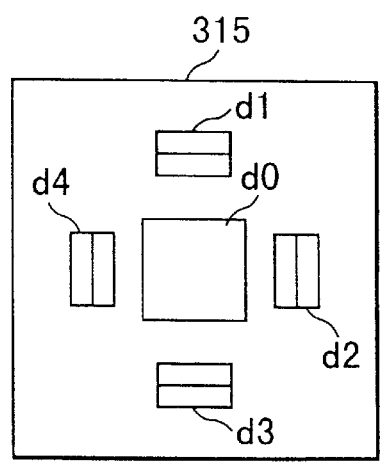

As shown in FIG. 23A or 23B, the photo detector 315 has five detection areas d0 and d1–d4, and detects the reflected beams of the record/reproduction optical beam and tilt detecting optical beam. To be more specific, detection area d0, which is the main detection area located in the center, serves to detect the reflected beam of the record/reproduction optical beam. The remaining four detection areas, which are sub-detection areas located around detection area d0 and arranged at the intervals of 90°, serve to detect the reflected beam of the tilt detecting optical beam. In the example shown in FIG. 23A, each of the sub-detection area is constituted by a single detection surface. In the example shown in FIG. 23B, however, each sub-detection area is made up of two surface divisions. Output signals produced by the photo detector 315 and corresponding to the main detection area d0 and sub-detection areas d1–d4 are supplied to an operation circuit (not shown). By this operation circuit, reproduction signals of the information recorded on the information recording surface 321 are derived from the output signal corresponding to the main detection area d0. The four output signals corresponding to the sub-detection areas d1–d4 are subjected to the operation by which to detect a disk tilt. A servo controller 214 drives a focus coil 204 in accordance with both the tilt direction and the tilt degree obtained by the tilt detection. In this manner, the tilt correction is performed.

The tilt servomechanism described above may be realized as one of the following:

(i) a servo apparatus that controls the lens of an optical pickup by employing an actuator disclosed in "Fast Disk Skew Servo for Optical Disk Pickup" SYMPOSIUM OPTICAL MEMORY 1994, Higher Density Optical Recording Technologies and Their Application, Jul. 11–13, 1994, International Conference Center, pp. 83–34; and (ii) a tilt servo mechanism employing a liquid crystal disclosed in "Tilt Servo Using a Liquid Crystal Device" INTERNATIONAL SYMPOSIUM ON OPTICAL MEMORY AND OPTICAL DATA STORAGE, 1996 Technical Digest Series Vol. 12, pp. 351–353.

Figure 24:
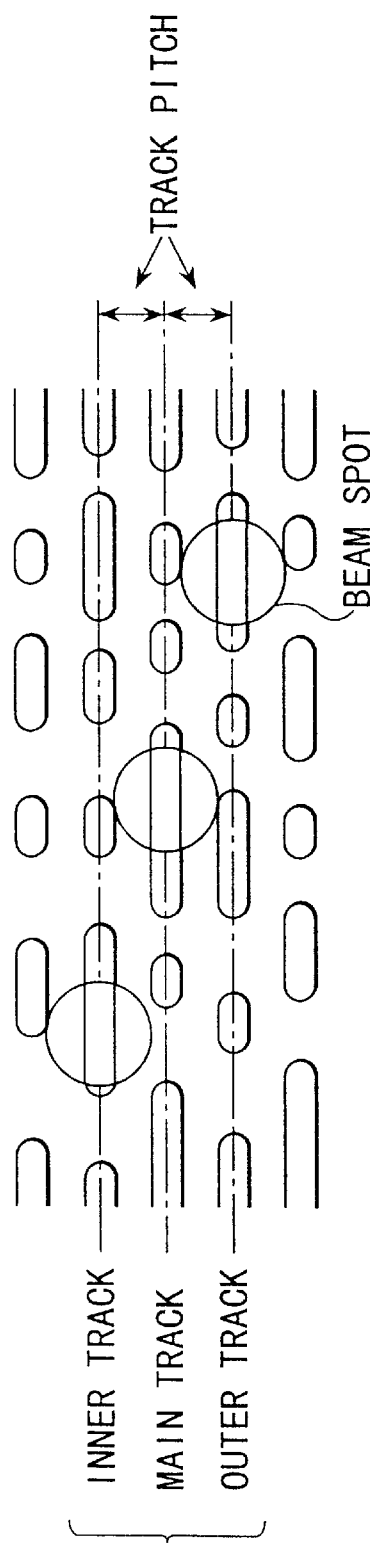
FIG. 24 shows a change of a reflection light of a tilt detection beam incident on a photo-detector due to a tile of a disk.
Figure 25:
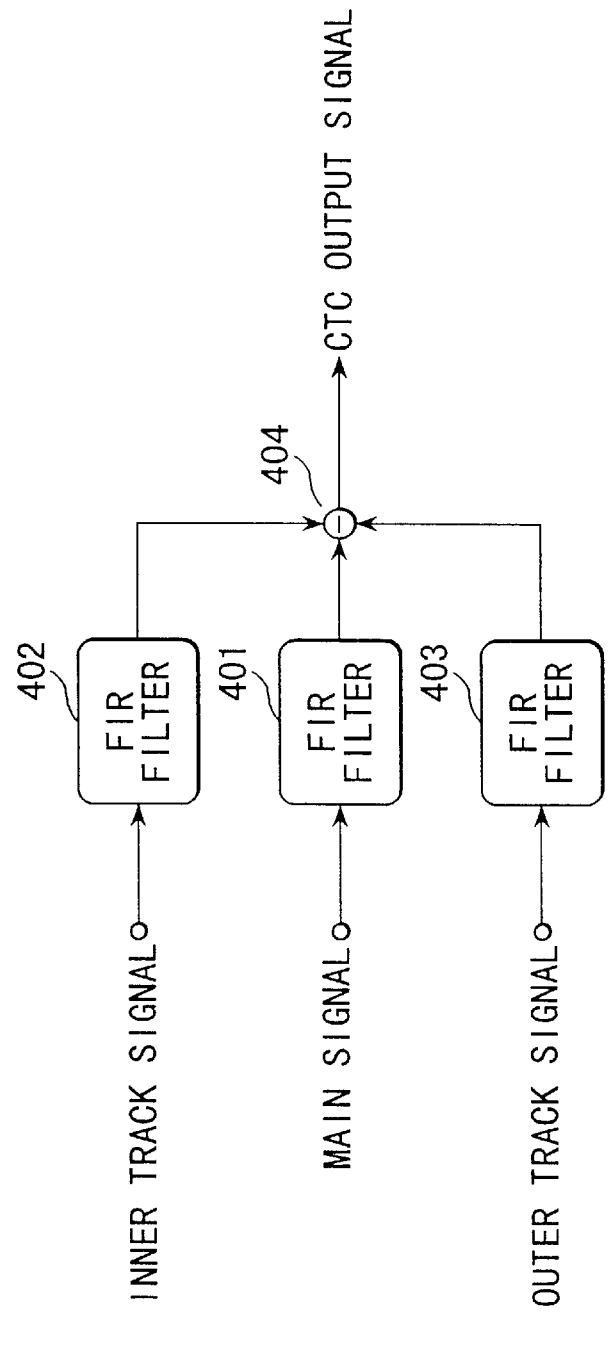
FIG. 25 shows a circuit diagram of a crosstalk canceller.

As a supplemental technique for a still higher recording density, it is through to employ a cross talk canceller. The cross talk canceller is an apparatus that reads information from those pit arrays which are located on the respective sides of the pit array under reproduction, and cancels cross talk by making use of the read information. The cross talk canceller will be described in more detail, referring to FIGS. 24 and 25. As shown in FIG. 24, a main track, its radially inward track, and its radially outward track are scanned by three beams, thereby obtaining a main signal, an inward track signal and an outward track signal. As shown in FIG. 25, the main signal, the inward track signal and the outward track signal are supplied to three FIR (Finite Impulse Response) filters 401, 402 and 403, respectively. The inward and outward track signals are delayed by predetermined times by the filters, and signals obtained thereby are multiplied by an attenuation coefficient to generate a pseudo-cross talk signal. This pseudo-cross talk signal is subtracted from the main signal by a subtracter 404. As a result, a reproduction signal cleared of cross talk components is output from the cross talk canceller.

The cross talk canceller described above is advantageous when it is used in combination with a high-density recording medium. Even if the pit arrays of the recording medium are close to one another, and cross talk should occur, such cross talk can be canceled by the cross talk canceller. Hence, the use of the cross talk canceller in combination with the present invention enables a further higher recording density.

According to the present invention, both the track pitch and pit pitch can set to be very short in comparison with the diameter of the spot of a reproduction optical beam. Even if the pitches are very short, the cross talk between the adjacent tracks can be suppressed to such an extent that it does not become a problem in practice. Accordingly, the present invention can provide an optical disk and an optical disk apparatus that enable remarkably high density and large storage capacity.

In addition, the present invention can provide an optical disk and an optical disk apparatus that enable high-density recording when the tilt angle of a disk is not more than 10 mrad.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk comprising: a substrate in which information to be picked up by a light beam radiated thereto through an objective lens are recorded as pit arrays formed at a predetermined track pitch; and a reflective layer formed on the substrate, wherein the track pitch is set within a range of $$(0.72 \text{ to } 0.8)\alpha \times (\lambda/NA)/1.14 \,\mu m,$$

when a wavelength of the light beam is $\lambda \mu m$ and a numerical aperture of the objective lens is NA, the $\alpha$ is represented by:

$$\alpha = 3.617 \times 10^{-14} \times (\theta A \ ds/\lambda)^3 + 1.248 \times 10^{-9} \times (\theta A \ ds/\lambda)^2 + 0.865$$

when a thickness of the optical disk is ds $\mu m$, and an allowable tilt angle of the optical disk is $\theta_A$ mrad, and the allowable tilt angle $\theta A$ is not more than 7 mrad.

2. An optical disk according to claim 1, wherein the substrate is composed of a pair of transparent substrates in which information is recorded and the reflective layer is formed on a pair of reflective films formed between the pair of transparent substrates.

3. An optical disk according to claim 2, wherein a pair of protective films are formed on the reflective films and these protective films are placed oppositely to each other and stuck.

4. An optical disk according to claim 3, wherein an adhesive layer for adhering the protective layers to each other is formed therebetween.

5. An optical disk according to claim 1, wherein the substrate is formed of at least one of polycarbonate and acrylic resins.

6. An optical disk according to claim 1, including a second substrate and a second reflective layer formed on this second substrate.

7. An optical disk according to claim 1, including protective layers formed on the reflective layer.

8. An optical disk apparatus comprising: an optical disk including a substrate in which information are recorded as pit arrays formed at a predetermined track pitch, and a reflective layer formed on the substrate; an objective lens arranged to face the optical disk; a light beam generator which radiates a light beam onto the optical disk through the objective lens; and a reproduction unit which detects a reflected beam of the light beam radiated onto the optical disk by the light beam generator so as to reproduce the information recorded in the optical disk, wherein the track pitch is set within a range of $$(0.72 \text{ to } 0.8)\alpha \times (\lambda/NA)/1.14 \, \mu m,$$

when a wavelength of the light beam is $\lambda \mu m$ and a numerical aperture of the objective lens is NA, the $\alpha$ is represented by:

$$\alpha = 3.617 \times 10^{-14} \times (\theta A \, ds/\lambda)^3 + 1.248 \times 10^{-9} \times (\theta A \, ds/\lambda)^2 + 0.865$$

when a thickness of the optical disk is ds $\mu m$, and an allowable tilt angle of the optical disk is $\theta_A$ mrad, and the allowable tilt angle $\theta A$ is not more than 7 mrad.

9. An optical disk apparatus according to claim 8, wherein the reproduction unit generates a push-pull signal and a reproduced signal for indicating a difference between signals detected at least in two areas in a track direction and the pits have depths set so that both levels of the push-pull and reproduced signals indicate large values.

10. An optical disk apparatus according to claim 8, wherein the reproduction unit is provided with a function of extending information compressed and recorded in the optical disk in accordance with MPEG 2 and reproducing original image information.

11. An optical disk apparatus according to claim 8, which includes a tilt servo unit which corrects a tilt of the optical disk.

12. An optical disk apparatus according to claim 8, which includes a cross talk canceller which reads information from the pit arrays under reproduction, and cancels cross talk by making use of the read information.

13. An optical disk comprising: a substrate in which information to be reproduced in response to a light beam radiated thereto through an objective lens are recorded as pit arrays formed at a predetermined track pitch; and a reflective layer formed on the substrate, wherein the track pitch is set within a range of $$(0.72 \text{ to } 0.8)\alpha \times (\lambda/NA)/1.14 \, \mu m,$$

when a wavelength of the light beam is $\lambda \mu m$ and a numerical aperture of the objective lens is NA, each of pits of the pit arrays is a trapezoidal-section pit which has an upper-region width within a range of $$(0.3 \text{ to } 0.50)\alpha \times (\lambda/NA)/1.14 \, \mu m$$

and a lower-region width within a range of $$(0.2 \text{ to } 0.32)\alpha \times (\lambda/NA)/1.14 \, \mu m,$$

and the $\alpha$ is represented by:

$$\alpha = 3.617 \times 10^{-14} \times (\theta A \, ds/\lambda)^3 + 1.248 \times 10^{-9} \times (\theta A \, ds/\lambda)^2 + 0.865$$

when a thickness of the optical disk is ds $\mu m$, and an allowable tilt angle of the optical disk is $\theta_A$ mrad.

14. An optical disk apparatus comprising: an optical disk including a substrate in which information are recorded as pit arrays formed at a predetermined track pitch, and a reflective layer formed on the substrate; an objective lens arranged to face the optical disk; means for radiating a light beam onto the optical disk through the objective lens; and means for detecting a reflected beam of the light beam radiated onto the optical disk by the radiating means so as to reproduce the information recorded in the optical disk, wherein the track pitch is set within a range of $$(0.72 \text{ to } 0.8)\alpha \times (\lambda/NA)/1.14 \, \mu m,$$

when a wavelength of the light beam is $\lambda \mu m$ and a numerical aperture of the objective lens is NA, each of pits of the pit arrays is a trapezoidal-section pit which has an upper-region width within a range of $$(0.3 \text{ to } 0.50)\alpha \times (\lambda/NA)/1.14 \, \mu m$$

and a lower-region width within a range of $$(0.2 \text{ to } 0.32)\alpha \times (\lambda/NA)/1.14 \, \mu m,$$

and the $\alpha$ is represented by:

$$\alpha = 3.617 \times 10^{-14} \times (\theta A \, ds/\lambda)^3 + 1.248 \times 10^{-9} \times (\theta A \, ds/\lambda)^2 + 0.865$$

when a thickness of the optical disk is ds $\mu m$, and an allowable tilt angle of the optical disk is $\theta_A$ mrad.

15. An optical disk comprising: a substrate in which information to be reproduced in response to a light beam radiated thereto through an objective lens are recorded as pit arrays formed at a predetermined track pitch; and a reflective layer formed on the substrate, wherein the track pitch is set within a range of $$(0.72 \text{ to } 0.8)\alpha \times (\lambda/NA)/1.14 \, \mu m,$$

when a wavelength of the light beam is $\lambda \mu m$ and a numerical aperture of the objective lens is NA, each of pits of the pit arrays is a trapezoidal-section pit which has an upper-region width within a range of $$(0.3 \text{ to } 0.50) \times (\lambda/NA)/1.14 \, \mu m$$

and a lower-region width within a range of $$(0.2 \text{ to } 0.32) \times (\lambda/NA)/1.14 \, \mu m,$$

and the $\alpha$ is represented by:

$$\alpha = 3.617 \times 10^{-14} \times (\theta A \, ds/\lambda)^3 + 1.248 \times 10^{-9} \times (\theta A \, ds/\lambda)^2 + 0.865$$

when a thickness of the optical disk is ds $\mu m$, and an allowable tilt angle of the optical disk is $\theta_A$ mrad.

16. An optical disk apparatus comprising: an optical disk including a substrate in which information are recorded as pit arrays formed at a predetermined track pitch, and a reflective layer formed on the substrate; an objective lens arranged to face the optical disk; a light beam generator which radiates a light beam onto the optical disk through the objective lens; and a reproduction head which detects a reflected beam of the light beam radiated onto the optical disk by the light beam generator so as to reproduce the information recorded in the optical disk, wherein the track pitch is set within a range of (0.72 to 0.8)α×(λ/NA)/1.14 μm, when a wavelength of the light beam is λ μm and a numerical aperture of the objective lens is NA, each of pits of the pit arrays is a trapezoidal-section pit which has an upper-region width within a range of (0.3 to 0.50)×(λ/NA)/1.14 μm and a lower-region width within a range of (0.2 to 0.32)×(λ/NA)/1.14 μm, and the α is represented by:

$\alpha = 3.617 \times 10^{-14} \times (\theta_A \, ds/\lambda)^3 + 1.248 \times 10^{-9} \times (\theta_A \, ds/\lambda)^2 + 0.865$ when a thickness of the optical disk is ds μm, and an allowable tilt angle of the optical disk is $\theta_A$ mrad.

* * * * *